United States Patent
Suzuki et al.

(10) Patent No.: US 8,513,362 B2
(45) Date of Patent: Aug. 20, 2013

(54) POLYOLEFIN POLYMER HAVING POLAR GROUP, METHOD FOR PRODUCTION THEREOF, AND WATER DISPERSION MATERIAL AND MOLD RELEASE AGENT COMPOSITION

(75) Inventors: Makoto Suzuki, Ichihara (JP); Naoshi Nagai, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 495 days.

(21) Appl. No.: 12/452,435

(22) PCT Filed: Jun. 17, 2008

(86) PCT No.: PCT/JP2008/061047
§ 371 (c)(1),
(2), (4) Date: Dec. 30, 2009

(87) PCT Pub. No.: WO2009/004917
PCT Pub. Date: Jan. 8, 2009

(65) Prior Publication Data
US 2010/0113728 A1    May 6, 2010

(30) Foreign Application Priority Data

Jul. 2, 2007   (JP) .................................. 2007-174422
Dec. 27, 2007  (JP) .................................. 2007-336085

(51) Int. Cl.
| C08F 8/10 | (2006.01) |
| C08F 8/12 | (2006.01) |
| C08F 8/46 | (2006.01) |
| C08F 8/42 | (2006.01) |
| B29C 33/62 | (2006.01) |

(52) U.S. Cl.
USPC ........ 525/285; 525/242; 525/333.7; 525/386; 524/576; 524/585

(58) Field of Classification Search
USPC .............. 525/333.7, 386, 242, 285; 524/576, 524/585
See application file for complete search history.

(56) References Cited

U.S. PATENT DOCUMENTS

| 6,459,005 | B1 | 10/2002 | Hirano et al. | |
| 2003/0027955 | A1* | 2/2003 | Ishii et al. | 526/127 |
| 2006/0211595 | A1* | 9/2006 | Sawaguchi | 510/475 |
| 2006/0223945 | A1* | 10/2006 | Hollingshurst et al. | 525/285 |

FOREIGN PATENT DOCUMENTS

| JP | 1-217007 | 8/1989 |
| JP | 3-91547 | 4/1991 |
| JP | 7-78098 | 8/1995 |
| JP | 2000-351813 | 12/2000 |
| JP | 2002-161111 A | 6/2002 |
| JP | 2003-73412 | 3/2003 |
| JP | 2003-252927 | 9/2003 |
| JP | 2005-194507 | 7/2005 |
| JP | 2006-77163 | 3/2006 |
| JP | 2006-183000 | 7/2006 |

OTHER PUBLICATIONS

Thompson et al., Polymer 39 (1998) 327-334.*
Lu, et al. "Maleic Anhydride Modified Polypropylene with Controllable Molecular Structure: New Synthetic Route via Borane-Terminated Polypropylene" Macromolecules, 1998, vol. 31, pp. 5943-5946.
Supplementary EP Search Report in EP 08 77 7285 dated Aug. 2, 2010.
Thompson, et al. "Terminal functionalization of polypropylene via the Alder Ene reaction" Polymer, 1998, vol. 39, No. 2, pp. 327-334.
Notice of Reasons for Rejection Japanese Patent Application No. 2009-521573 dated Oct. 23, 2012.

* cited by examiner

*Primary Examiner* — Roberto Rabago
(74) *Attorney, Agent, or Firm* — Foley & Lardner LLP

(57) ABSTRACT

To provide a polyolefin polymer having a polar group represented by Formula (i) produced by modifying, with a high modification ratio, a double bond in a polymer having the double bond at one terminal, both terminals, or at the inside of a polymer chain thereof that is obtained by a known method; a method for producing the polyolefin polymer; and a water dispersion material and a mold release agent composition each containing the polyolefin polymer,

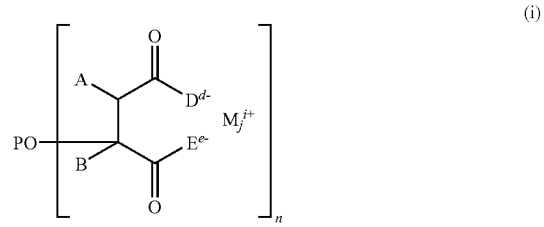

wherein, PO, A, B, D, E, d, e, M, i, j, and n are defined as in the application.

17 Claims, 4 Drawing Sheets

POLYOLEFIN POLYMER HAVING POLAR GROUP, METHOD FOR PRODUCTION THEREOF, AND WATER DISPERSION MATERIAL AND MOLD RELEASE AGENT COMPOSITION

TECHNICAL FIELD

The present invention relates to a polyolefin polymer having one or more polar groups at least at one terminal, both terminals, or at the inside thereof, a method for producing the same, a water dispersion material using the same, and a mold release agent composition using the same.

BACKGROUND ART

Low molecular weight polyethylene polymers fall under the category of polyethylene oligomers. The polyethylene oligomers are also referred to as a polyethylene wax, and are roughly classified into animal and plant-based, mineral-based, refined petroleum-based, and synthetic types. Examples of polyethylene waxes having a functional group at one terminal of a polymer chain thereof include a mineral-based montanic acid wax. However, the montanic acid wax has a problem of high production costs since it is extracted and purified from natural brown coal.

One example of a synthetic systems that enables production of a polyethylene wax at a low cost is a system using a metallocene catalyst. However, in such a system, although a, reactive vinyl group can be introduced into one terminal of the polymer chain, a chain transfer agent such as hydrogen needs to be used for reducing the molecular weight of the polymer chain. Since the terminal of a polymer generated by the chain transfer agent is saturated thereby, there has been a problem that the number of terminal vinyl groups of the polymer chain to which other functional groups can be introduced is extremely small.

Also, in either a high pressure radical method or a Ziegler catalyst method, both of which are widely-used synthetic processes, a terminal vinyl group of a polymer chain is difficult to obtain, and moreover, it is difficult to intentionally introduce the terminal vinyl group into the polymer chain.

Much research has been made into overcoming the above-described problems, and a method for introducing a double bond into a polymer chain with a high ratio has been developed (e.g., Japanese Patent Application Laid-Open (JP-A) No. 2003-73412). On the other hand, as a method for introducing a functional group to a double bond of a polymer chain, a method for modifying a liquid ethylene polymer having a double bond at one terminal thereof with an unsaturated carboxylic acid derivative or the like is known (e.g., Japanese Patent Publication (JP-B) No. 7-78098), and a method for modifying a double bond at one terminal of a low molecular weight ethylene polymer into a functional group of various kinds (e.g., JP-A No. 1-217007), and the like are also known.

However, these modification methods have problems in that the ratio of modification of a double bond into a functional group is low, purification of the resultant is laborious due to the simple polymerization of the unsaturated carboxylic acid derivative used in the method, or the like.

[Patent-Document 1] JP-A No. 2003-73412
[Patent Document 2] JP-B No. 7-78098
[Patent Document 3] JP-A No. 1-217007

DISCLOSURE OF THE INVENTION

Problems to be Solved by the Invention

It is an object of the invention to provide a novel polymer that solves the existing problems described above.

More specifically, it is an object of the invention to provide a novel polyolefin polymer having a polar group obtained by modifying, with a high modification ratio, a double bond of a polymer obtained by a known method, the polymer having the double bond at one terminal, both terminals, or at the inside of its polymer chain. It is another object of the invention to provide a method in which the polyolefin polymer having a polar group can be industrially produced with a high ratio of modification of the double bond to a functional group. It is still another object of the invention to provide a water dispersion material and a mold release agent composition including the polyolefin polymer having a polar group.

Means for Solving the Problems

The present inventors have conducted extensive research and examination with respect to a polymer that can achieve the above-described objects and, as a result, the present inventors have found that a polyolefin polymer having a polar group obtained by the following process is novel and extremely useful, and thus have accomplished the invention. The polyolefin polymer having a polar group according to the invention is obtained by modifying a double bond of a polyolefin polymer having the double bond at least at one terminal, both terminals, or at the inside thereof, with a modification ratio of as high as 80% or more, and subsequently hydrolyzing the same, More specifically, the invention includes the following embodiments.

<1> A polyolefin polymer having a polar group represented by Formula (i), obtained by hydrolyzing an intermediate compound, the intermediate compound comprising at least one of a polyolefin polymer having a polar group represented by Formula (ii) or a polyolefin polymer having a polar group represented by Formula (iii):

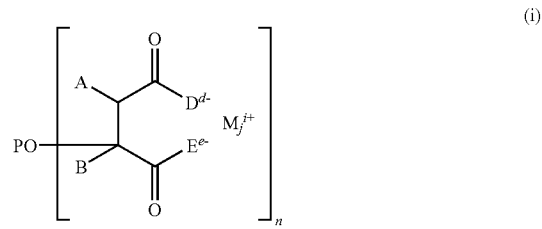

wherein in Formula (i), PO represents a polyolefin polymer obtained by polymerizing a monomer including ethylene or including an olefin having 3 to 20 carbon atoms, and a group shown in the brackets is the polar group of the polyolefin polymer; A and B each independently represent $R^1$, a cyano group, $C(O)OR^1$, or $C(O)NR^1R^2$, and A and B may be combined to form a cyclic structure; M represents a metal cation or an onium cation; j is an integer of 0 to 4 representing the number of the metal cation or the onium cation; i is an integer of 0 to 4 representing the number of valency of the metal cation or the onium cation; D and E each independently represent an oxygen atom, a nitrogen atom, a sulfur atom, $R^3$, $OR^3$, $SR^3$, or $NR^3R^4$, and D and E may be combined to form a cyclic structure; d and e each independently are an integer of 0 to 4 representing respectively the number of valency of the substituent D and the number of valency of the substituent E; $R^1, R^2, R^3$, and $R^4$ each independently represent hydrogen, an optionally substituted alkyl, alkenyl, alkynyl, aralkyl or aryl group having 20 or less carbon atoms, or a group having a heterocyclic ring; and n represents the average number of functional groups, and ranges from 0.80 to 10.0:

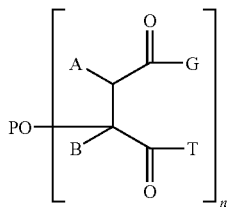

(ii)

wherein in Formula (ii), PO, A, B, and n have the same definitions as those in Formula (i); G and T each independently represent halogen, $R^5$, $OR^S$, $SR^S$, or $NR^5R^6$, and G and T may form a cyclic structure; $R^5$ and $R^6$ each independently represent hydrogen, an optionally substituted alkyl, alkenyl, alkynyl, aralkyl, or aryl group having 20 or less carbon atoms, or a group having a heterocyclic ring; and the modification ratio of double bonds in the PO achieved by the polar group shown in the brackets is 80% or more:

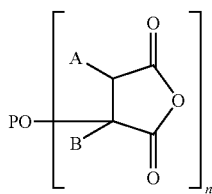

(iii)

wherein in Formula (iii), PO, A, B, and n have the same definitions as those in Formula (i); and the modification ratio of double bonds in the PO achieved by the polar group shown in the brackets is 80% or more.

<2> A polyolefin polymer having a polar group represented by Formula (ii):

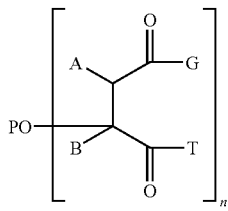

(ii)

wherein in Formula (ii), PO represents a polyolefin polymer obtained by polymerizing a monomer including ethylene or including an olefin having 3 to 20 carbon atoms, and a group shown in the brackets is the polar group of the polyolefin polymer; A and B each independently represent R', a cyano group, $C(O)OR^1$, or $C(O)NR^1R^2$, and A and B may be combined to form a cyclic structure; G and T each independently represent halogen, $R^5$, $OR^5$, $SR^5$, or $NR^5R^6$, and G and T may form a cyclic structure; R', $R^2$, $R^5$, and $R^6$ each independently represent hydrogen, an optionally substituted alkyl, alkenyl, alkynyl, aralkyl, or aryl group having 20 or less carbon atoms, or a group having a heterocyclic ring; n represents the average number of functional groups, and ranges from 0.80 to 10.0; and the modification ratio of double bonds in the PO achieved by the polar group shown in the brackets is 80% or more.

<3> A polyolefin polymer having a polar group represented by Formula (iii):

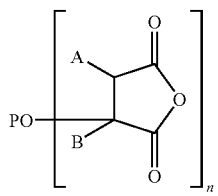

(iii)

wherein in Formula (iii), PO represents a polyolefin polymer obtained by polymerizing a monomer including ethylene or including an olefin having 3 to 20 carbon atoms, and a group shown in the brackets is the polar group of the polyolefin polymer; A and B each independently represent $R^1$, a cyano group, $C(O)OR^1$, or $C(O)NR^1R^2$, and A and B may be combined to form a cyclic structure; $R^1$ and $R^2$ each independently represent a halogen, an optionally substituted alkyl, alkenyl, alkynyl, aralkyl, or aryl group having 20 or less carbon atoms, or a group having a heterocyclic ring; n represents the average number of functional groups, and ranges from 0.80 to 10.0; and the modification ratio of double bonds in the PO achieved by the polar group shown in the brackets is 80% or more.

<4> The polyolefin polymer having a polar group according to any one of <1> to <3>, wherein the polar group is present at one terminal or both terminals of the polyolefin polymer.

<5> The polyolefin polymer having a polar group according to any one of <1> to <4>, wherein the PO in Formulae (i) to (iii) is a homopolymer of ethylene or an olefin having 3 to 20 carbon atoms, or a copolymer obtained by polymerizing two or more kinds of monomers.

<6> A method for producing a polyolefin polymer having a polar group, the method comprising:
synthesizing a polyolefin polymer having one or more unsaturated bonds at least at one terminal or at the inside of a polymer chain;
synthesizing an intermediate compound by modifying the unsaturated bond of the polyolefin polymer by reacting the polyolefin polymer, a polymerization inhibitor, and at least one selected from the compounds represented by Formulae (vii), (viii), or (x); and
hydrolyzing the intermediate compound:

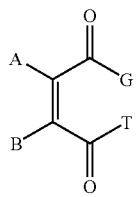

(vii)

wherein in Formula (vii), A and B each independently represent R¹, a cyano group, C(O)OR¹, or C(O)NR¹R², and A and B may be combined to form a cyclic structure; G and T each independently represent halogen, R⁵, OR⁵, SR⁵, or NR⁵R⁶, and G and T may form a cyclic structure; and R¹, R², R⁵, and R⁶ each independently represent hydrogen, an optionally substituted alkyl, alkenyl, alkynyl, aralkyl, or aryl group having 20 or less carbon atoms, or a group having a heterocyclic ring:

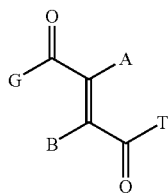

(viii)

wherein in Formula (viii), A, B, G, and T have the same definitions as those in Formula (vii): and

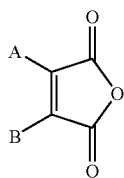

(x)

wherein in Formula (x), A and B have the same definitions as those in Formula (vii).

<7> A method for producing a polyolefin polymer having a polar group, the method comprising subjecting the polyolefin polymer having a polar group according to <1> to a salt exchange reaction:

<8> A water dispersion material, comprising the polyolefin polymer having a polar group according to any one of <1> to <5>.

<9> The water dispersion material according to <8>, having a thixotropic property.

<10> The water dispersion material according to <8> or <9>, wherein the polyolefin polymer having a polar group is dispersed in the form of a worm-like micelle.

<11> A mold release agent composition, comprising the polyolefin polymer having a polar group according to any one of <1> to <5>.

Effects of the Invention

The invention can provide a novel polyolefin polymer having a polar group that is obtained by modifying, with a high modification ratio, a double bond of a polymer obtained by a known method, the polymer having the double bond at one terminal, both terminals, or at the inside of a polymer chain thereof; a method in which the polyolefin polymer having a polar group can be industrially produced and the modification ratio of the double bond into a functional group is high; and a water dispersion material and a mold release agent composition each containing the polyolefin polymer having a polar group.

BEST MODES FOR CARRYING OUT THE INVENTION

Figure 1:
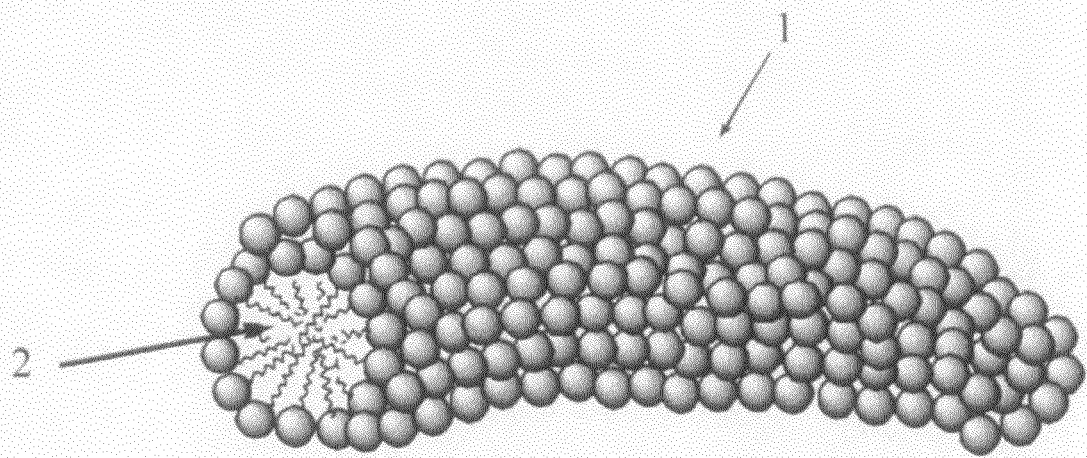
[FIG. 1] An enlarged schematic view illustrating an example of the shape of the polyolefin polymer having a polar group in a water dispersion material.

Hereinafter, the invention will be described in detail.
<Polyolefin Polymer Having a Polar Group>
(Polyolefin polymer having a polar group represented by Formula (i))

A first polyolefin polymer having a polar group of the invention (hereinafter sometimes referred to as "first polymer") is a polyolefin polymer having the structure represented by Formula (i).

The first polymer of the invention can be produced by modifying a double bond of a polyolefin polymer obtained by polymerizing a monomer including ethylene or including an olefin having 3 to 20 carbon atoms (hereinafter sometimes referred to as "polymer (A)") with a compound having a specific polar group, and then subjecting the same to hydrolysis or ion exchange. Details of the first polymer will be described later.

The polymer (A) for use in the invention (PO portion in Formula (i)) is a homopolymer or a copolymer formed from at least one selected from ethylene, α-olefins having 3 to 20 carbon atoms, and dienes having 4 to 20 carbon atoms, or a polymer obtained by subjecting these polymers to thermal decomposition. The polymer (A) is a polymer having one or more unsaturated bonds at least at one terminal, both terminals, or at the inside of its polymer chain.

Examples of the α-olefins having 3 to 20 carbon atoms for use in the production of the polymer (A) include, but not limited thereto, aliphatic α-olefins, alicyclic α-olefins, and aromatic α-olefins.

Examples of the aliphatic α-olefins include propylene, 1-butene, 3-methyl-1-butene, 3,3-dimethyl-1-butene, 1-pentene, 4-methyl-1-pentene, 4,4-dimethyl-1-pentene, 1-hexene, 3-methyl-1-hexene, 4-methyl-1-hexene, 1-octene, 1-decene, 1-dodecene, 1-tetradecene, 1-hexadecene, 1-octadecene, and 1-eicocene.

Examples of the alicyclic α-olefins include allylcyclohexane, vinylcyclopropane, and vinylcyclohexane. Examples of the aromatic α-olefins include styrene and allylbenzene.

Among the above, α-olefins having 3 to 20 carbon atoms are preferable, α-olefins having 3 to 8 carbon atoms are more preferable, and propylene, 1-butene, 1-hexene, and 4-methyl-1-pentene are particularly preferable.

Examples of the dienes having 4 to 20 carbon atoms include, but not limited thereto, aliphatic dienes, alicyclic dienes, and aromatic dienes.

Examples of the aliphatic dienes include butadiene, isoprene, 1,3-pentadiene, 1,4-pentadiene, 1,3-hexadiene, 1,4-hexadiene, 1,5-hexadiene, 2-methyl-1,4-hexadiene, 1,3-octadiene, 1,4-octadiene, 1,5-octadiene, 1,6-octadiene, 1,7-octadiene, 2-methyl-1,4-octadiene, 7-methyl-1,6-octadiene, 4-ethylidene-8-methyl-1,7-nonadiene, and 1,3-eicosadiene.

Examples of the alicyclic dienes include ethylidene norbornene, vinyl norbornene, 5-methylene-2-norbornene, dicyclopentadiene, 5-cyclohexylidene-2-norbornene, and bicyclo[2,2,1]-hepta-2,5-diene. Examples of the aromatic dienes include p-divinylbenzene.

Among the above, aliphatic dienes having 4 to 10 carbon atoms and alicyclic dienes having 4 to 12 carbon atoms are preferable, aliphatic dienes having 4 to 9 carbon atoms and alicyclic dienes having 4 to 10 carbon atoms are more preferable, and butadiene, isoprene, vinyl norbornene, and bicyclo[2,2,1]-hepta-2,5-diene are particularly preferable.

For the production of the polymer (A), one or two or more monomers among the above are used, and a homopolymer or a copolymer can be produced.

The weight average molecular weight (Mw) as measured by gel permeation chromatography (hereinafter abbreviated as GPC) of the polymer (A) is preferably in the range of 400 to 500,000, more preferably in the range of 800 to 200,000, and still more preferably in the range of 1,200 to 100,000. The ratio of the weight average molecular weight (Mw) to the number average molecular weight (Mn) as measured by GPC, i.e., the molecular weight distribution (Mw/Mn), of the polymer (A) is preferably in the range of 6.0 or lower, more preferably in the range of 5.0 or lower, and still more preferably in the range of 4.0 or lower.

The weight average molecular weight (Mw) and the molecular weight distribution (Mw/Mn) were measured as follows, using GPC-150 manufactured by Millipore Corp. The separation column was TSK GNH HT. The column size was 7.5 mm in diameter and 300 mm in length. The column temperature was adjusted to 140° C. Orthodichlorobenzene (Wako Pure Chemical Ind. Ltd.) was used as a mobile phase, and 0.025 mass % of BHT (Takeda Chemical) was used as an antioxidant. The moving rate was 1.0 ml/minute. The sample concentration was adjusted to 0.1 mass %, the amount of injection of the sample was adjusted to 500 microliter, and a differential refractometer was used as a detector. The standard polystyrene used as a base was a product manufactured by Tosoh Corporation.

In Formula (i) above, the group shown in the brackets is the polar group. In the polar group, A and B each independently represent $R^1$, a cyano group, $C(O)OR^1$, or $C(O)NR^1R^2$, and A and B may be combined to form a cyclic structure. D and E each independently represent an oxygen atom, a nitrogen atom, a sulfur atom, $R^3$, $OR^3$, $SR^3$, or $NR^3R^4$, and D and E may be combined to form a cyclic structure.

The $R^1$, $R^2$, $R^3$, and $R^4$ above each independently represent hydrogen, an optionally substituted alkyl, alkenyl, alkynyl, aralkyl, or aryl group having 20 or less carbon atoms, or a group having a heterocyclic ring. A functional group having a hetero atom may be bonded to each of these groups.

Examples of the alkyl group in this case include, but not limited thereto, linear, branched, or cyclic alkyl groups having 1 to 20 carbon atoms. Examples of the linear alkyl groups include a methyl group, an ethyl group, an n-propyl group, an n-butyl group, an n-decyl group, an n-octadecyl group, a 2,2,2-trifluoroethyl group, a 2-hydroxyethyl group, a 2,3-dihydroxypropyl group, a 2-(vinyl carbonyloxy)ethyl group, an N-(2-hydroxyethyl) amino group, an N-(2-mercaptoethyl) amino group, a (2-aminoethyl) thiol group, and a (2-hydroxyethyl) thiol group.

Examples of the branched alkyl group include an isopropyl group, an isobutyl group, a sec-butyl group, a t-butyl group, a 2-methyloctadecyl group, a 1,1,1,3,3,3-hexafluoro-2-propyl group, a 2-(1,3-dihydroxy-2-hydroxymethyl)propylamino group, and a 1-(2-amino-1-hydroxy-2-hydroxymethyl)propyloxy group.

Examples of the cyclic alkyl group include a cyclopentyl group, a cyclohexyl group, a 2-hydroxycyclohexyl group, a 2,3-dihydroxycyclohexyl group, a 2-amino cyclohexyl group, a 2,3-diamino cyclohexyl group, and a 2-mercaptocyclohexyl group.

Examples of the alkenyl group include, but not limited thereto, a linear, branched, or cyclic alkenyl group. Examples of the linear alkenyl groups include a vinyl group, an allyl group, and a 4-pentenyl group. Examples of the branched alkenyl groups include an isopropenyl group, an isopentyl group, a 3-hydroxypropenyl group, a 3-aminopropenyl group, and a 5-hydroxy-2-methyl-3-pentenyl group. Examples of the cyclic alkenyl groups include a cyclopentenyl group, a cyclohexenyl group, a dicyclopentadienyl group, a 1-hydroxycyclohexyl group, a 2-amino cyclohexyl group, a 2,3-dihydroxycyclohexyl group, and a 2,3-diamino cyclohexyl group.

Examples of the alkynyl group include, but not limited thereto, a linear, branched, or cyclic alkynyl group. Examples of the linear alkynyl groups include an ethynyl group, a 1-propynyl group, a 2-propynyl group, a 1-butynyl group, a 2-butynyl group, and a 3-butynyl group. Examples of the branched alkynyl groups include a 2-methyl-2-propynyl group and a 3-methyl-1-butynyl group. Examples of the cyclic alkynyl groups include a 2-ethynyl-1-cyclohexyl group and a 3-(2-propynyl)-1-cyclopentyl group.

Examples of the aralkyl group include, but not limited thereto, an aralkyl group in which an aromatic hydrocarbon or an aromatic heterocycle is substituted. Examples of the aralkyl groups in which an aromatic hydrocarbon is substituted include a benzyl group, a 2-hydroxybenzyl group, a 2,4-dihydroxybenzyl group, a 2,4,6-trihydroxy benzyl group, a 2-aminobenzyl group, a 2,4-diaminobenzyl group, a 2,4,6-triaminobenzyl group, a 2-mercaptobenzyl group, a 2,4-dimercaptobenzyl group, a 2,4,6-trimercaptobenzyl group, a 2,4-difluorobenzyl group, a pentafluoro phenylmethyl group, a 4-vinyl phenylmethyl group, a phenethyl group, and a 2-naphthyl methyl group. Examples of the aralkyl groups in which an aromatic heterocycle is substituted include a 2-pyridyl methyl group, a 3-thiophenyl methyl group, and a 3-furyl methyl group.

Examples of the aryl group include, but not limited thereto, aromatic hydrocarbons. Examples of the aromatic hydrocarbons include a phenyl group, a 2-hydroxyphenyl group, a 2,4-dihydroxyphenyl group, a 2,4,6-trihydroxy phenyl group, a 2-aminophenyl group, a 2,4-diamino phenyl group, a 2,4,6-triamino phenyl group, a 2-mercaptophenyl group, a 2,4-dimercapto phenyl group, a 2,4,6-trimercapto phenyl group, a 2,4-dichlorophenyl group, a 4-methoxypheny group, a 4-methoxycarbonyl group, a 4-nitrophenyl group, a hexafluoro phenyl group, a tolyl group, a xylyl group, and a naphthyl group.

Examples of the group having a heterocycle include, but not limited thereto, groups in which an aromatic heterocycle is substituted. Examples of the aromatic heterocycles include a 2-pyridyl group, 3-pyridyl group, a 3-chloro-2-pyridyl group, a 3-hydroxy-2-pyridyl group, a 3-amino-2-pyridyl group, a 3-mercapto-2-pyridyl group, a 2-thienyl group, a 2-chloro-3-thienyl group, a 2-furyl group, a 1-pyrazolyl group, and a 2-(1,3-thiazolyl) group.

In Formula (i) above, M represents a metal cation or an onium cation.

Examples of the metal cation include, but not limited thereto, cations of metal atoms of Groups 1A, 2A, 3A, 4A, 5A, 6A, 7A, 8, 1B, 2B, 3B, and 4B of the periodic table (these group numbers correspond to Groups 1 to 14 according to Revised edition of IUPAC Inorganic Chemistry Nomenclature (1989), the same applies hereinafter).

Examples of the cations of metal atoms of Group 1A include cations of lithium, sodium, potassium, rubidium, caesium, francium, and the like. Examples of the cations of metal atoms of Group 2A include cations of beryllium, magnesium, calcium, strontium, barium, radium, and the like. Examples of the cations of metal atoms of Group 3A include cations of scandium, yttrium, samarium, and the like. Examples of the cations of metal atoms of Group 4A include cations of titanium, zirconium, hafnium, and the like. Examples of the cations of metal atoms of Group 5A include cations of vanadium, niobium, tantalum, and the like. Examples of the cations of metal atoms of Group 6A include cations of chromium, molybdenum, tungsten, and the like. Examples of the cations of metal atoms of Group 7A include cations of manganese, technetium, rhenium, and the like. Examples of the cations of metal atoms of Group 8A include cations of iron, ruthenium, osmium, cobalt, rhodium, iridium, nickel, palladium, platinum, and the like. Examples of the cations of metal atoms of Group 1B include cations of copper, silver, gold, and the like. Examples of the cations of metal atoms of Group 2B include cations of zinc, cadmium, mercury, and the like. Examples of the cations of metal atoms of Group 3B include cations of aluminium, gallium, indium, thallium, and the like. Examples of the cations of metal atoms of Group 4B include cations of germanium, tin, lead, and the like.

Among the above, the cations of the metal atoms of Groups 1A, 2A, 1B, 2B, and 3B are preferable, and the cations of lithium, sodium, calcium, cesium, magnesium, calcium, barium, silver, zinc, and aluminum are more preferable.

Examples of the onium cation include, but not limited thereto, an oxonium cation, an ammonium cation, a sulfonium cation, a sulfoxonium cation, a phosphonium cation, and a phosphazenium cation.

Examples of the oxonium cation include hydronium.

Examples of the ammonium cation include, but not limited thereto, an ammonium cation in which an aliphatic substituent is substituted, and an ammonium cation in which an aromatic substituent is substituted.

Examples of the ammonium cations in which an aliphatic substituent is substituted include trimethyl aminium, triethyl aminium, triallyl aminium, tetraethylammonium, tetrabutylammonium, trioctylmethylammonium, tetrakis(2-hydroxyethyl)ammonium, piperidinium, prolinium, and glycinium. Examples of the ammonium cations in which an aromatic substituent is substituted include diphenylmethyl aminium, triphenyl aminium, triphenylmethyl ammonium, 4-dimethylamino pyridinium, imidazolium, and 1-methylpyridinium.

Examples of the sulfonium cation include, but not limited thereto, sulfonium cations in which an aliphatic substituent is substituted and sulfonium cations in which an aromatic substituent is substituted.

Examples of the sulfonium cations in which an aliphatic substituent is substituted include trimethyl phosphonium, (ethoxy carbonylmethyl)dimethyl sulfonium, tris(2-hydroxyethyl)sulfonium, dimethyl(propargyl)sulfonium, and (2-carboxyethyl)dimethyl sulfonium. Examples of the sulfonium cations in which an aromatic substituent is substituted include triphenylsulfonium, phenyltetramethylene sulfonium, 1-methylthiophenium, and diphenylmethylsulfonium.

Examples of the sulfoxonium cation include, but not limited thereto, sulfoxonium cations in which an aliphatic substituent is substituted and sulfoxonium cations in which an aromatic substituent is substituted.

Examples of the sulfoxonium cations in which an aliphatic substituent is substituted include trimethyl sulfoxonium. Examples of the sulfoxonium cations in which an aromatic substituent is substituted include diphenylmethyl sulfoxonium.

Examples of the phosphonium cation include, but not limited thereto, phosphonium cations in which an aliphatic substituent is substituted and phosphonium cations in which an aromatic substituent is substituted.

Examples of the phosphonium cations in which an aliphatic group is substituted include triethyl phosphonium, tetrabuthyl phosphonium, trioctyl methyl phosphonium, and tetrakis(2-hydroxyethyl)phosphonium. Examples of the phosphonium cations in which an aromatic group is substituted include triphenyl phosphonium, butyltriphenylphosphonium, vinyltriphenylphosphonium, tetraphenylphosphonium, 1,1-diphenylphosphonium, 2,4,6-triphenylphosphonium, cyclohexyltriphenylphosphonium, triphenyl(2-pyridyl methyl)phosphonium, and (2-hydroxyethyl)triphenyl phosphonium.

Examples of the phosphazenium cation include, but not limited thereto, phosphazenium cations in which an aliphatic substituent is substituted and phosphazenium cations in which an aromatic substituent is substituted.

Examples of the phosphazenium cations in which an aliphatic substituent is substituted include tetrakis[tris(dimethylamino)phosphoranylidenamino]phosphonium and tetrakis[tris(pyrrolidin-1-yl)phosphoranylidenamino]phosphonium. Examples of the phosphazenium cation in which an aromatic substituent is substituted include tetrakis[tris(diphenylamino)phosphoranylidenamino]phosphonium.

Among these onium cations, an ammonium cation, a phosphonium cation, and a phosphazenium cation are preferable, and tetrabutylammonium, tetraphenylphosphonium, and tetrakis[tris(dimethylamino)phosphoranylidenamino]phosphonium are more preferable.

In Formula (i), j represents the number of the metal cation(s) or the onium cation(s), and is an integer of 0 to 4, preferably 0 to 2. i represents the number of valence of the metal cation or the onium cation, and is an integer of 0 to 4, preferably 0 to 2. In Formula (i), d and e represent the number of valence of the substituent D and the number of valence of the substituent E, respectively, and each independently represent an integer of 0 to 4, preferably 0 to 2.

For example, in the case of j=0, d=0 and e=(i×j−d)=0, which shows that the polymer of Formula (i) contains a neutral substituent. The total number of positive charges is obtained by i×j, and the total number of negative charges is obtained by d+e. Since the total number of positive charges and the total number of negative charges are equal (i×j=d+e), the total number of the charges is 0 (neutral). For example, in the case of (i, j)=(1, 2), the combination of (d, e) is (d, e)=(0, 2), (1, 1), or (2, 0).

When D and E are combined to form a cyclic structure in Formula (i), the first polymer of the invention has the structure represented by the following Formula (Iv).

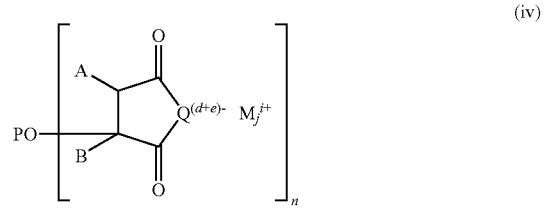

(iv)

In Formula (Iv), PO, A, B, M, n, d, e, i, and j have the same definitions as those of Formula (i), and Q represents a nitrogen atom, $R^3$, or $NR^3$. $R^3$ has the same definitions as the substituent described for Formula (i).

In Formula (i), n represents an average number of functional groups and is in the range of 0.80 to 10.0. This value is preferably in the range of 0.85 to 5.00, and more preferably 0.90 to 3.00.

Here, the average number of functional groups will be described. For example, when n is 1.00, it indicates that one carbonyl group-containing substituent (polar group) is bonded to all the polymers as an average value. In fact, the polymers are presumed to be an assembly of the following six kinds of polymers: i) a polymer having a carbonyl group-containing substituent at one terminal; ii) a polymer having a carbonyl-containing substituent at the inside thereof; iii) a polymer having a carbonyl-containing substituent at both terminals; iv) a polymer having a carbonyl-containing substituent at one terminal and at the inside thereof; v) a polymer having a carbonyl-containing substituent at both terminals and at the inside thereof; and vi) a polymer having both terminals and the inside thereof that are formed from a saturated hydrocarbon. Therefore, in the invention, the reason why the value of n can be less than 1 is that the average number is determined including a polymer of type (vi), which is a saturated hydrocarbon in which nothing is bonded to its terminal or the like (n=0).

The average number of functional groups is determined by the following Equation (1), wherein X is the content of double bonds in the polymer (A) as a starting material (calculated from the integration ratio of a terminal methyl group to a double bond as measured by $^1$H-NMR), and U is the modification ratio obtained by Equation (3) shown later.

$$n = X \times U/100 \qquad \text{Equation (1)}$$

The double bond content (X) can be calculated by $^1$H-NMR. Specifically, the measurement is conducted at 120° C. after completely dissolving the polymer in deuterated-1,1,2,2-tetrachloroethane serving as a lock solvent and as a solvent. The peak of deuterated-1, 1,2,2-tetrachloroethane is determined as 5.91 ppm and the chemical shift values of other peaks are determined based on this peak.

For example, when the polymer having a double bond at one terminal is formed only from ethylene, a peak (A) for three protons of a methyl group at a saturated terminal appears in the range of from 0.80 ppm to 0.95 ppm, while a peak (B) for two protons of three protons in a terminal double bond and a peak (C) for one proton of the three protons in the terminal double bond appear in the range of from 4.88 ppm to 5.05 ppm and in the range of from 5.75 ppm to 5.90 ppm, respectively. In this case, the double bond content (X) is calculated by the following Equation 2, wherein the peak integral values of the peak (A), the peak (B), and the peak (C) are defined as $S_A$, $S_B$, and $S_C$, respectively.

$$X = (S_B + S_C)/S_A \qquad \text{Equation (2)}$$

(Polyolefin Polymer Having a Polar Group Represented by Formula (ii))

A second polyolefin polymer having a polar group of the invention (hereinafter sometimes referred to as "second polymer") is a polyolefin polymer having the structure represented by Formula (ii). As described later, the second polymer is not only the polyolefin polymer having a polar group of the invention, but is also used as an intermediate compound for obtaining the first polymer represented by Formula (i).

The second polymer represented by Formula (ii) can be produced by modifying the double bond of the polymer (A) described in the first polymer. Details of the second polymer will be described later.

In Formula (ii), PO, A, B, and n have the same definitions as those of the first polymer represented by Formula (i). G and T each independently represent halogen, $R^5$, $OR^S$, $SR^S$, or $NR^5R^6$, and G and T may form a cyclic structure. $R^5$ and $R^6$ each independently represent hydrogen, an optionally substituted alkyl, alkenyl, alkynyl, aralkyl, or aryl group having 20 or less carbon atoms, or a group having a heterocyclic ring. Examples of the alkyl, alkenyl, alkynyl, aralkyl, or aryl group and the group having a heterocyclic ring include, but not limited thereto, the same as those described in the first polymer represented by Formula (i).

When G and T are combined to form a cyclic structure in Formula (ii), the second polymer of the invention has a structure of Formula (vi).

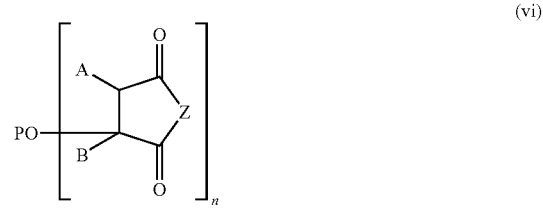

In Formula (vi), PO, A, B, and n have the same definitions as those of the first polymer represented by Formula (i). Z represents $R^7$, sulfur, or $NR^7$. $R^7$ represents hydrogen, an optionally substituted alkyl, alkenyl, alkynyl, aralkyl, or aryl group having 20 or less carbon atoms, or a group having a heterocyclic ring. Examples of the alkyl, alkenyl, alkynyl, aralkyl, or aryl group and the group having a heterocyclic ring include, but not limited thereto, the same as those described in the first polymer represented by Formula (i).

(Polyolefin Polymer Having a Polar Group Represented by Formula (iii))

A third polyolefin polymer having a polar group of the invention (hereinafter sometimes referred to as a "third polymer") is a polyolefin polymer having the structure represented by Formula (iii). As described later, the third polymer is not only the polyolefin polymer having a polar group of the invention, but is also used as an intermediate compound for obtaining the first polymer represented by Formula (i).

The third polymer represented by Formula (iii) can be produced by modifying the double bond of the polymer (A) described in the first polymer. Details of the third polymer will be described later.

In Formula (iii), PO, A, B, and n have the same definitions as those of the first polymer represented by Formula (i).

Specific examples of the polyolefin polymer having a polar group represented by Formulae (i) to (iii) (including those represented by Formulae (Iv) and (vi)) are collectively shown in Tables 1 and 2. Hereinafter, each polymer in the Tables is sometimes referred to as, for example, "Exemplary Compound (1)" (polymer designated as No. 1) in accordance with the "No." given to the compound in the Tables. In the Tables, "Me" represents a methyl group, "Et" represents an ethyl group, "Bu" represents a butyl group, "Ph" represents a phenyl group, and "PZN" represents a tetrakis[tris(dimethylamino)phosphoranylidenamino]phosphonium cation ($[(Me_2N)_3P=N]_4P^+$).

TABLE 1

| No. | Formula | PO | A | B | D | d | E | e | M | i | j | G | T | Q | n |
|---|---|---|---|---|---|---|---|---|---|---|---|---|---|---|---|
| 1 | (iii) | Polyethylene | H | H | — | — | — | — | — | — | — | — | — | — | 1.16 |
| 2 | (iii) | Polyethylene | H | H | — | — | — | — | — | — | — | — | — | — | 0.99 |
| 3 | (iii) | Poly(ethylene-propylene) | H | H | — | — | — | — | — | — | — | — | — | — | 1 |
| 4 | (iii) | Poly(propylene-butene) | H | H | — | — | — | — | — | — | — | — | — | — | 1.26 |
| 5 | (ii) | Poly(ethylene-propylene) | H | H | — | — | — | — | — | — | — | OMe | OMe | — | 0.97 |
| 6 | (ii) | Polyethylene | H | H | — | — | — | — | — | — | — | OMe | OMe | — | 0.95 |
| 7 | (i) | Polyethylene | H | H | O | 1 | O | 1 | Ca | 2 | 1 | — | — | — | 0.99 |
| 8 | (i) | Polyethylene | H | H | O | 1 | O | 1 | Na | 1 | 2 | — | — | — | 1.16 |
| 9 | (i) | Poly(ethylene-propylene) | H | H | O | 1 | O | 1 | Na | 1 | 2 | — | — | — | 1 |
| 10 | (i) | Polyethylene | H | H | O | 1 | O | 1 | Na | 1 | 2 | — | — | — | 0.95 |
| 11 | (i) | Polyethylene | H | H | O | 1 | O | 1 | Ca | 2 | 1 | — | — | — | 0.99 |
| 12 | (i) | Poly(propylene-butene) | H | H | O | 1 | O | 1 | Na | 1 | 2 | — | — | — | 1.26 |
| 13 | (i) | Polyethylene | H | H | O | 1 | O | 1 | K | 1 | 2 | — | — | — | 1.16 |
| 14 | (i) | Polypropylene | H | H | O | 1 | O | 1 | K | 1 | 2 | — | — | — | 0.99 |
| 15 | (i) | Poly(ethylene-propylene) | H | H | O | 1 | O | 1 | Cs | 1 | 2 | — | — | — | 0.95 |
| 16 | (i) | Polyethylene | H | H | O | 1 | O | 1 | Mg | 2 | 1 | — | — | — | 0.99 |
| 17 | (i) | Polypropylene | H | H | O | 1 | O | 1 | Zn | 2 | 1 | — | — | — | 1 |
| 18 | (i) | Polyethylene | H | H | O | 1 | O | 1 | Fe | 2 | 1 | — | — | — | 0.99 |
| 19 | (i) | Poly(ethylene-propylene) | H | H | O | 1 | O | 1 | Ba | 2 | 1 | — | — | — | 0.98 |
| 20 | (i) | Polyethylene | H | H | O | 1 | O | 1 | Li | 1 | 2 | — | — | — | 0.95 |

TABLE 2

| No. | Formula | PO | A | B | D | d | E | e | M | i | j | G | T | Q | n |
|---|---|---|---|---|---|---|---|---|---|---|---|---|---|---|---|
| 21 | (i) | Polypropylene | Me | H | O | 1 | O | 1 | Cu | 2 | 1 | — | — | — | 1 |
| 22 | (i) | Poly(ethylene-propylene) | H | H | O | 1 | O | 1 | Ag | 1 | 2 | — | — | — | 0.94 |
| 23 | (i) | Poly(propylene-butene) | H | H | O | 1 | O | 1 | NH$_4$ | 1 | 2 | — | — | — | 0.95 |
| 24 | (i) | Polyethylene | H | H | O | 1 | O | 1 | NBU$_4$ | 1 | 2 | — | — | — | 0.93 |
| 25 | (i) | Polyethylene | Ph | H | O | 1 | O | 1 | Pb | 2 | 1 | — | — | — | 0.91 |
| 26 | (i) | Polyvinylnorbornene | H | H | O | 1 | O | 1 | NBU$_4$ | 1 | 2 | — | — | — | 0.92 |
| 27 | (i) | Polypropylene | H | H | O | 1 | O | 1 | Ni | 2 | 1 | — | — | — | 0.93 |
| 28 | (i) | Polyethylene | H | H | O | 1 | O | 1 | NH$_4$ | 1 | 2 | — | — | — | 0.95 |
| 29 | (i) | Polypropylene | H | H | O | 1 | O | 1 | AlOH | 2 | 1 | — | — | — | 0.89 |
| 30 | (i) | Polyethylene | H | H | O | 1 | O | 1 | PZN | 1 | 2 | — | — | — | 0.95 |
| 31 | (i) | Polypropylene | Et | H | O | 1 | OH | 0 | PZN | 1 | 1 | — | — | — | 0.93 |
| 32 | (iv) | Polyethylene | H | H | — | 1 | — | 0 | Le | 1 | 1 | — | — | N | 0.92 |
| 33 | (iv) | Polyethylene | H | H | — | 1 | — | 0 | Na | 1 | 1 | — | — | NCH$_2$CH$_2$COO | 0.95 |
| 34 | (iv) | Polypropylene | H | H | — | 1 | — | 0 | K | 1 | 2 | — | — | NCH$_2$CH$_2$N | 0.96 |
| 35 | (iii) | Polyvinylnorbornene | H | H | — | — | — | — | — | — | — | — | — | — | 0.98 |
| 36 | (iii) | Polypropylene | H | H | — | — | — | — | — | — | — | — | — | — | 1 |
| 37 | (ii) | Polyethylene | H | H | — | — | — | — | — | — | — | NHMe | NHMe | — | 0.85 |
| 38 | (ii) | Polyethylene | H | H | — | — | — | — | — | — | — | NMe$_2$ | NMe$_2$ | — | 0.88 |
| 39 | (ii) | Polypropylene | H | H | — | — | — | — | — | — | — | OMe | OH | — | 1 |
| 40 | (ii) | Polyethylene | H | H | — | — | — | — | — | — | — | SMe | SH | — | 0.95 |

With respect to the first polymer, the second polymer, and the third polymer of the invention described above, it is preferable that the polar group in the brackets of Formulae (i) to (iii) be present at one terminal or at both terminals of the polyolefin polymer, from the viewpoint of the formation of a worm-like micelle or the development of other various physical properties described later.

<Method for Producing a Polyolefin Polymer Having a Polar Group>

As described above, the first polymer represented by Formula (i) of the invention can be obtained by hydrolyzing at least one of the second polymer and the third polymer represented by Formulae (II) and (iii) as an intermediate compound. Therefore, methods for producing the second polymer and the third polymer will be described first.

(Method for Producing the Second Polymer)

The second polymer represented by Formula (ii) of the invention can be produced by reacting, in a solvent system or in a non-solvent system, the following components: (a) a polyolefin polymer having one or more unsaturated bonds at least at one terminal, both terminals, or at the inside of its polymer chain; (b) a polymerization inhibitor; and (c) at least one of the compound represented by Formulae (vii) and (viii).

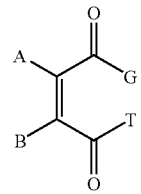

(vii)

In Formula (vii), A, B, G, and T have the same definitions as those of the second polymer represented by Formula (ii).

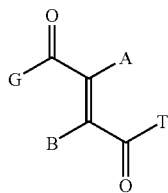

(viii)

In Formula (viii), A, B, G, and T have the same definitions as those of the second polymer represented by Formula (ii).

Examples of (a) the polyolefin polymer having one or more unsaturated bonds at least at one terminal, both terminals, or at the inside of its polymer chain include, but not limited thereto, the polymer (A) described above and polymers obtained by thermal decomposition of the same. The polyolefin polymers having an unsaturated bond may be used singly or as a mixture of two or more thereof.

The production of the polyolefin polymer having an unsaturated bond can be carried out by either a liquid phase polymerizing method, such as dissolution polymerization or suspension polymerization, or a gas phase polymerization method. Specific examples of inert hydrocarbon media for use in the liquid phase polymerizing method include aliphatic hydrocarbons, such as propane, butane, pentane, hexane, heptane, octane, decane, dodecane, or kerosene; alicyclic hydrocarbons, such as cyclopentane, cyclohexane, or methylcyclopentane; aromatic hydrocarbons, such as benzene, toluene, or xylene; halogenated hydrocarbons, such as ethylene chloride, chlorobenzene, or dichloromethane; or mixtures thereof. An olefin itself can also be used as a solvent.

The polymerization temperature is generally in the range of −50° C. to 200° C., and preferably in the range of 0° C. to 170° C. The polymerization pressure is generally from normal pressure to 100 kg/cm², and preferably from normal pressure to 50 kg/cm². The polymerization reaction can be performed by any of a batch method, a semi-continuous method, or a continuous method. The polymerization can be performed in two or more stages with different reaction conditions.

Examples of known olefin polymerization catalysts include, but not limited thereto, solid Ti catalyst components disclosed in JP-A No. 4-218507, metallocene catalysts of JP-B No. 7-37488 and JP-A Nos. 2-41303 and 9-87313, or non-metallocene catalysts disclosed in the specification of EP 0874005A and J. Am. Chem. Soc., 125, 4306 (2003).

Suitable ranges of the molecular weight and the molecular weight distribution of the polyolefin polymer having an unsaturated bond obtained by the above synthesizing process are the same as the suitable weight average molecular weight (Mw) and the molecular weight distribution (Mw/Mn) described in the polymer (A) in the first polymer (polyolefin polymer synthesizing process).

Examples of (b) the polymerization inhibitor include, but not limited thereto, a phenol polymerization inhibitor, a nitrosamine polymerization inhibitor, and phenothiazin.

Examples of the phenol polymerization inhibitors include 2,6-di-t-butylphenol, 2,6-di-t-butyl-4-methylphenol, hydroquinone, 4-methoxyphenol, 2,5-di-t-butylhydroquinone, methylhydroquinone, p-benzoquinone, t-butyl-p-benzoquinone, and 2,5-diphenyl-p-benzoquinone. Examples of the nitroso polymerization inhibitor include N-nitrosophenylhydroxylamine and tris(N-nitroso-N-phenyl hydroxylaminato) aluminium.

Among the above, phenol polymerization inhibitors are preferable, 2,6-di-t-butylphenol, 2,6-di-t-butyl-4-methylphenol, hydroquinone, 4-methoxyphenol, 2,5-di-t-butylhydroquinone, methylhydroquinone, and p-benzoquinone are more preferable, and 2,6-di-t-butylphenol, 2,6-di-t-butyl-4-methylphenol, hydroquinone, and 4-methoxyphenol are still more preferable.

By adding these polymerization inhibitors, formation of a homopolymer of (c) the compounds represented by Formulae (vii) and (viii) can be suppressed and purification of the obtained resin can be facilitated, and moreover, the modification ratio of unsaturated bonds of (a) the polyolefin polymer having an unsaturated bond (polymer (A)) can be improved. The modification ratio achieved in this reaction is 80% or more, more preferably 85% or more, and still more preferably 95% or more.

The addition amount of these polymerization inhibitors is not particularly limited, and is preferably in the range of 0.01 time to 20 times, more preferably 0.05 time to 5 times, and still more preferably 0.1 time to 1 time the mass of the polymer (A) to be used.

Furthermore, (c) the compounds represented by Formulae (vii) and (viii) are compounds having a reactive double bond, and are in a relationship of geometrical cis-trans isomers with each other. When G and T in Formulae (vii) and (viii) form a cyclic structure, the structure represented by the following Formula (ix) is achieved.

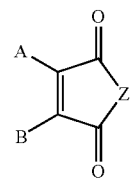

(ix)

In Formula (ix), A and B have the same definitions as those of the first polymer represented by Formula (i). Z represents R³, sulfur, or NR³, and R³ has the same definitions as the substituents described in Formula (i).

Examples of the compounds represented by Formulae (vii) and (viii) include, but not limited thereto, imides, carboxylic acids, acid halides, amides, esters, and carboxylic thioesters. Examples of the imides include maleimide. Examples of the carboxylic acids include aliphatic carboxylic acids, alicyclic carboxylic acids, and aromatic carboxylic acids. Examples of the aliphatic carboxylic acids include mesaconic acid, citraconic acid, and maleic acid. Examples of the alicyclic carboxylic acids include 1-cyclopentene-1,2-dicarboxylic acid. Examples of the aromatic carboxylic acids include phenylmaleic acid.

Examples of the acid halides include aliphatic acid halides, alicyclic acid halides, and aromatic acid halides.

Examples of the aliphatic acid halides include maleic acid dichloride and maleic acid dibromide. Examples of the alicyclic acid halides include cyclohex-1-ene-1,2-dicarboxylic acid chloride. Examples of the aromatic acid halides include 2-phenylmaleic acid dichloride.

Examples of the amides include aliphatic amides, alicyclic amides, and aromatic amides.

Examples of the aliphatic amides include N,N'-methylmaleamide. Examples of the alicyclic amides include (z)-1,2,3,4-tetrahydro-1,4-diazocine-5,8-dione. Examples of the aromatic amides include 2-phenylmaleamide.

Examples of the esters include aliphatic esters, alicyclic esters, and aromatic esters.

Examples of the aliphatic esters include dimethyl maleate and tetraethyl ethene tetracarboxylate. Examples of the alicyclic esters include dimethyl-1,4-cyclohexadiene-1,2-dicarboxylate and dimethyl-7-oxabicyclo[2.2.1]hepta-2,5-diene-2,3-dicarboxylate. Examples of the aromatic esters include 2-phenyl dimethyl maleate.

Examples of the carbothioesters include aliphatic carbothioesters, alicyclic carbothioesters, and aromatic carbothioesters.

Examples of the aliphatic carbothioesters include (z)-S,S-dimethylbut-2-ene bis(thioate). Examples of the alicyclic carbothioesters include S,S-diethyl cyclohex-1-ene-1,2-bis(carbothioate). Examples of the aromatic carbothioesters include S,S-dimethyl-2-phenyldithiomaleate.

These compounds represented by Formulae (vii) and (viii) may be used singly or as a mixture of two or more thereof. The amount of these compounds is not particularly limited, and is preferably in the range of 0.01 time to 50 times, more preferably 0.1 time to 20 times, and still more preferably 0.5 time to 5 times the mass of the polymer (A) to be used.

In the production of the second polymer represented by Formula (ii), the reaction may be performed in the presence or absence of a solvent. The solvent to be used is not limited insofar as the invention is not adversely affected. Examples of the solvent include aliphatic hydrocarbons, such as n-hexane; cycloaliphatic hydrocarbons, such as cyclohexane; aromatic hydrocarbons, such as toluene, xylene, or mesitylene; esters, such as ethyl acetate; ketones, such as acetone, methyl ethyl ketone, methyl isobutyl ketone, or diethyl ketone; ethers, such as tetrahydrofuran or 1,4-dioxane; halogenated hydrocarbons, such as chloroform, dichloroethane, trichloroethane, or perchloroethane; halogenated aromatic groups, such as chlorobenzene or o-dichlorobenzene; and substituted aromatic groups, such as nitrobenzene.

Among the above, aliphatic hydrocarbons, cycloaliphatic hydrocarbons, aromatic hydrocarbons, halogenated hydrocarbons, and halogenated aromatic groups are preferable, aromatic hydrocarbons and halogenated aromatic groups are more preferable, and mesitylene and o-dichlorobenzene are still more preferable. These solvents may be used singly or as a mixture of two or more thereof.

The amount of the solvent depends on the solubility of raw materials, but is preferably 0.1 time to 100 times, more preferably 0.5 time to 50 times, and still more preferably 1 time to 10 times the mass of the polymer (A) used as a raw material.

The reaction can be performed as follows, for example. In a reactor, (a) the polymer (A), (b) a polymerization inhibitor, (c) at least one of the compounds represented by Formulae (vii) and (viii) are placed, and then the temperature is increased. The raw materials may be mixed in a single step, or may be appropriately added in several steps. At this time, in order to accelerate the reaction, additives such as a catalyst may be used. The reaction temperature is not particularly limited insofar as the invention is not adversely affected, and is preferably in the range of from room temperature to 300° C., more preferably 100° C. to 250° C., and still more preferably 150° C. to 230° C. Since the reaction temperature may exceed the boiling point in some cases depending on the type of the compound or the solvent to be used, a suitable reactor, such as an autoclave, should be selected. The reaction time may change depending on the amount or the reactivity of the polymer (A), the solvent or the polymerization inhibitor to be used, and is generally 20 hours to 120 hours.

The progress of the reaction can be confirmed by $^1$H-NMR. More specifically, the measurement is conducted at 120° C. after completely dissolving the polymer in deuterated-1,1,2,2-tetrachloroethane serving as lock solvent and a solvent, in a measuring sample tube. The peak of deuterated-1,1,2,2-tetrachloroethane is determined as 5.91 ppm, and the chemical shift values of other peaks are determined based on this peak.

For example, in the case of a polymer having a double bond at one terminal formed only from ethylene, the peak for three protons of a methyl group at a saturated terminal appears in the range of 0.80 ppm to 0.95 ppm, while the peak (B) for two protons in three protons of a terminal double bond and the peak for one proton in the three protons of a terminal double bond appear in the range of 4.88 ppm to 5.05 ppm and in the range of 5.75 ppm to 5.90 ppm, respectively. As the reaction proceeds, the peak (B) for two protons observed in the range of 4.88 ppm to 5.05 ppm and the peak for one proton observed in the range of 5.75 ppm to 5.90 ppm disappear. As the reaction proceeds, another peak for one proton (D) is observed in the range of 5.20 ppm to 5.40 ppm and yet another peak for one proton is observed in the range of 5.50 ppm to 5.70 ppm, as a result of occurrence of shift of the double bond. Then, a polyolefin polymer having a double bond that is modified with at least one of the compounds represented by Formulae (vii) and (viii) is generated.

At this time, the inversion ratio (U %) (equivalent to the "modification ratio" in the invention) of the reaction is calculated by the following Equation (3), wherein the peak integral values of the peak (B) and the peak (D) are defined as $S_B$ and $S_D$, respectively.

$$U(\%) = S_D \times 100 / [(S_B/2) + S_D] \qquad \text{Equation (3)}$$

The production method as mentioned above is industrially usable, and the polymer (A) as a raw material almost quantitatively reacts with the at least one of the compounds represented by Formulae (vii) and (viii). In the invention, the modification ratio of double bonds achieved by the polar group (groups in the structures represented by Formulae (vii) and (viii)) as determined by Equation (3) is 80% or more. The modification ratio is preferably 85% or more, and more preferably 95% or more.

After the reaction, the excess raw materials, the solvent, the polymerization inhibitor, or the like are removed by a simple operation, such as crystallization or washing, thereby obtaining the target second polymer (intermediate compound for obtaining the first polymer) of the invention. Moreover, the above reaction can also be carried out without isolating the polymer (A) as the raw material from the production process of the same (intermediate compound synthesizing process).

(Method for Producing the Third Polymer)

The third polymer represented by Formula (iii) of the invention can be produced by reacting, in a solvent system or in a non-solvent system, the following components: (a) a polyolefin polymer having one or more unsaturated bonds at least at one terminal, both terminals, or at the inside of the polymer chain; (b) a polymerization inhibitor; and (d) a compound represented by the following Formula (x).

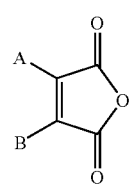

(x)

In Formula (x), A and B have the same definitions as those of the first polymer represented by Formula (i).

Here, (a) the polyolefin polymer having one or more unsaturated bonds at least at one terminal, both terminals, or at the inside of the polymer chain, and (b) the polymerization inhibitor are the same as that described in the method for producing the second polymer represented by Formula (ii), respectively. The compound (d) represented by Formula (x) is an acid anhydride having a reactive double bond.

Examples of the compound represented by Formula (x) include, but not limited thereto, aliphatic acid anhydrides and aromatic acid anhydrides.

Examples of the aliphatic acid anhydrides include maleic anhydride, citraconic anhydride, tetrahydrophthalic anhydride, cis-aconitic anhydride, and 2-norbornene-2,3-dicarboxylic anhydride. Examples of the aromatic acid anhydride include 5-vinylisobenzofuran-1,3-dione, phenylmaleic anhydride, and 4-vinyl-2,3-pyridinedicarboxylic anhydride.

The production of the third polymer represented by Formula (iii) can be performed in a manner substantially similar to the method for producing the second polymer represented by Formula (ii), except that (d) the compound represented by Formula (x) is used instead of the at least one of (c) the compounds represented by Formulae (vii) and (viii).

The method for producing the third polymer represented by Formula (iii) can also be industrially used and, for example, the polymer (A) as the raw material almost quantitatively reacts with the compound represented by Formula (x). In the invention, the modification ratio of double bonds achieved by the polar group (group of the structure represented by Formula (x)) as determined by Equation (3) is 80% or more. The modification ratio is preferably 85% or more, and more preferably 95% or more.

(Method for Producing the First Polymer)

The first polymer represented by Formula (i) of the invention can be produced by hydrolyzing at least one of the second polymer represented by Formula (ii) and the third polymer represented by Formula (iii). More specifically, the first polymer represented by Formula (i) of the invention can be obtained by preparing at least one of the second polymer and the third polymer as an intermediate compound by the polyolefin synthesizing process and the intermediate compound synthesizing process as mentioned above, and then hydrolyzing the same by a hydrolysis process.

The second polymer and the third polymer may be used singly or as a mixture of two or more thereof.

The hydrolysis can be performed using water and a base or an acid. Examples of the base to be used include, but not limited thereto, inorganic bases, organic bases, and ion exchange resins.

Examples of the inorganic bases include hydroxides, carbonates, and hydrogen carbonates of alkali metals, such as lithium, sodium, potassium, or cesium; hydroxides, carbonates, and hydrogen carbonates of alkaline earth metals, such as magnesium or calcium; oxides of these metals; iron hydroxide; and potassium cyanide.

Examples of the organic bases include methylamine, ethylamine, n-butylamine, isobutylamine, dibutylamine, triethylamine, ethanolamine, diethanolamine, piperidine, piperazine, 1,4-diaminocyclohexane, benzylamine, ethylenediamine, aniline, 2-aminopyridine, m-phenylenediamine, tetramethylammonium hydroxide, and tetraethylammonium hydroxide.

Examples of the ion exchange resins include AMBERLYST-21 (registered trademark) and AMBERLYST-93 (registered trademark).

Among the above bases, lithium hydroxide, sodium hydroxide, potassium hydroxide, calcium hydroxide, cesium hydroxide, magnesium hydroxide, sodium carbonate, calcium carbonate, ammonia, methylamine, ethylamine, n-butylamine, trimethylamine, triethylamine, aniline, 2-aminopyridine, m-phenylenediamine, tetramethylammonium hydroxide, tetramethylammonium hydroxide, tetraethylammonium hydroxide, and AMBERLYST-21 are preferable, and sodium hydroxide, potassium hydroxide, calcium hydroxide, ammonia, methylamine, ethylamine, and tetramethylammonium hydroxide are more preferable.

Examples of the acid for use in the production thereof include, but not limited thereto, inorganic acids, organic acids, ion exchange resins, and Lewis acids.

Examples of the inorganic acids include hydrochloric acid, sulfuric acid, and phosphoric acid. Examples of the organic acids include p-toluenesulfonic acid, acetic acid, trifluoroacetic acid, formic acid, and phenol. Examples of the ion exchange resins include AMBERLYST-15 (registered trademark). Examples of the Lewis acids include boron trichloride, zinc dichloride, aluminium trichloride, and triisopropoxy aluminium.

Among the above acids, hydrochloric acid, sulfuric acid, p-toluenesulfonic acid, acetic acid, trifluoroacetic acid, aluminum trichloride, and triisopropoxy aluminum are preferable, and hydrochloric acid, sulfuric acid, trifluoroacetic acid, aluminum trichloride, and triisopropoxy aluminum are more preferable.

In the production of the first polymer represented by Formula (i), the hydrolysis reaction may be carried out using water alone or in combination with other solvents. The solvent to be used is not particularly limited insofar as the invention is not adversely affected. Examples thereof include various solvents as mentioned in the method for producing the second polymer represented by Formula (ii), and alcohols such as methanol, ethanol, isopropanol, n-butanol, monoethylene glycol, diethylene glycol, 1,3-propanediol, or 1,2-cyclohexanediol. The amount of the solvents is not particularly limited insofar as the invention is not adversely affected, and, for example, the amount as described in the method for producing the second polymer represented by Formula (ii) is preferable.

The reaction can be performed as follows, for example. Namely, at least one of the second polymer represented by Formula (ii) and the third polymer represented by Formula (iii), a solvent, and a base or an acid are placed in a reactor, and the temperature is increased. These raw materials may be mixed in a single step or may be appropriately added in several steps. The reaction temperature is not particularly limited insofar as the invention is not adversely affected, and is preferably in the range of from room temperature to 200° C., more preferably 40° C. to 150° C., and still more preferably 50° C. to 120° C. Since the reaction temperature may exceed the boiling point in some cases depending on the type of the compound or the solvent to be used, a suitable reactor such as an autoclave should be selected. The reaction time may change depending on the amount or the reactivity of the solvent or the additives to be used, and is generally from several hours to 50 hours.

After the reaction, the base or acid, the solvent, or the like is removed by a simple operation, such as crystallization or washing, thereby obtaining the first polymer of the invention. The reaction can also be carried out in succession, without isolating the second polymer represented by Formula (ii) or the third polymer represented by Formula (iii) as the raw material from the production process of the same.

In the invention, a polyolefin polymer having a polar group represented by the following Formula (ib) may also be produced by subjecting the first polymer represented by Formula (i) obtained as described above to salt exchange. By utilizing the salt exchange reaction, polyolefin polymers having a polar group having various different physical properties can be obtained.

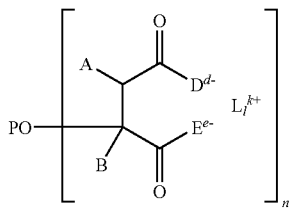

(ib)

In Formula (ib), PO, A, B, D, E, d, e, and n have the same definitions as those of the first polymer represented by Formula (i). L represents a metal cation or an onium cation, and l represents the number of metal cation(s) or onium cation(s) and is an integer of 0 to 4, preferably 0 to 2. k represents the valence of the metal cation or the onium cation and is an integer of 0 to 4, preferably 0 to 2. However, L is not the same as M in Formula (i).

For example, when $l=0$, $d=0$ and $e=(k \times l - d)=0$, and the polymer of Formula (ib) includes a neutral substituent. The total number of positive charges is given as $l \times k$ and the total number of negative charges is given as $d+e$, and since the total number of positive charges and the total number of negative charges are equal ($l \times k = d+e$), the total number of the charges is 0 (neutral). For example, in the case of $(k, l)=(1, 2)$, the combination of $(d, e)$ is $(d, e)=(0, 2), (1, 1)$, and $(2, 0)$.

When D and E are combined to form a cyclic structure, the polyolefin polymer having a polar group represented by Formula (Ib) has a structure represented by the following Formula (v).

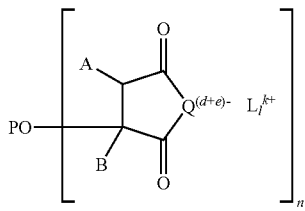

(v)

In Formula (v), PO, A, B, L, n, d, e, k, and l have the same definitions as those of the polyolefin polymer having a polar group represented by Formula (Ib), and Q has the same definitions as that of the polyolefin polymer represented by Formula (Iv).

The first polymer represented by Formula (i) as the raw material may be used singly or as a mixture of two or more thereof.

The salt exchange can be carried out using a water-soluble mineral-salt or an onium salt. Examples of the water-soluble mineral salt to be used include, but not limited thereto, metal halides. Examples of the metal halides include halides of Group 2A, transition metals, and Group 3B of the periodic table. Examples of the halides of Group 2A of the periodic table include halides of beryllium, calcium, magnesium, barium, or the like. Examples of the halides of transition metals include halides of chromium, iron, copper, silver, zinc, cadmium, or the like. Examples of the halides of Group 3B of the periodic table include halides of boron, aluminum, gallium, or the like. Among these metal halides, metal chlorides are preferable, and calcium chloride, magnesium chloride, barium chloride, and zinc chloride are more preferable.

Examples of the water-soluble onium salt to be used include, but not limited thereto, salts of the onium cation described in the first polymer represented by Formula (i).

When the polymer of Formula (ib) according to the invention is produced, the salt exchange reaction may be carried out using only water or a mixture of water and other solvents. The solvent to be used is not limited insofar as the invention is not adversely affected, and examples thereof include the solvents described in the hydrolysis reaction in the method for producing the first polymer represented by Formula (i). The amount of the solvents to be used is not limited insofar as the invention is not adversely affected, and, for example, the solvent amount described in the method for producing the second polymer represented by Formula (ii) is preferable.

The salt exchange reaction can be performed as follows, for example. The first polymer represented by Formula (i), a solvent, and an inorganic salt or an onium salt are placed in a reactor, and the temperature is increased. The raw materials may be mixed in a single step, or may be added in several steps. The reaction temperature is not particularly limited insofar as the invention is not adversely affected, and is preferably in the range of from room temperature to 200° C., more preferably 40° C. to 150° C., and still more preferably 50° C. to 120° C. Since the reaction temperature may exceed the boiling point depending on the type of the compound or the solvent to be used, suitable reactors, such as an autoclave, should be selected. Although the reaction time may change depending on the amount or the reactivity of the solvent or the additives to be used, and is generally from several hours to 50 hours.

After the reaction, the inorganic salt or the onium salt, the solvent, or the like are removed by a simple operation, such as crystallization or washing, thereby obtaining the target polymer of the invention. In the reaction, the reaction can also be carried out in succession without isolating the first polymer represented by Formula (i) as the raw material from the production process thereof.

<Water Dispersion Material>

In a water dispersion material of the invention, the aforementioned polyolefin polymer having a polar group is dispersed in an aqueous medium. The aqueous medium is a solution containing water. Here, "water" refers to refined water, such as distilled water, ion exchanged water, or ultra-pure water.

When the polyolefin polymer having a polar group of the invention is added to ink or a coating agent, for example, favorable dispersibility in an aqueous medium can be achieved, and abrasion resistance and lubricating properties can be improved.

Specifically, the water dispersion material containing the polymer of the invention contains each of the following combinations as the components in an aqueous medium:

A. (e) the polyolefin polymer having a polar group of the invention singly; B. (e) the polyolefin polymer having a polar group of the invention, and (f) polyethylene glycol alkyl ether;

C. (e) the polyolefin polymer having a polar group of the invention, (f) polyethylene glycol alkyl ether, and (g) a polyolefin oligomer; and D. (e) the polyolefin polymer having a polar group of the invention, and (g) a polyolefin oligomer.

The aqueous medium may also include ingredients other than the above.

The (f) polyethylene glycol alkyl ether in the invention is a compound having an alkyl group of 12 to 22 carbon atoms, and including 4 to 50,000 repeating units of an oxyethylene group. A copolymer of an oxyethylene group with an oxyalkylene group, such as an oxypropylene group, is also included in the (f) polyethylene glycol alkyl ether.

Examples of such a compound include polyoxyethylene dodecylether, polyoxyethylene cetyl ether, polyoxyethylene octyl ether, polyoxyethylene stearyl ether, polyoxyethylene oleyl ether, polyoxyethylene lauryl ether, and octaethylene glycol mono-n-dodecyl ether. Specific examples include EMULGEN 120P, EMULGEN 320P, EMULGEN 420, EMULGEN 1108, EMULGEN 2020 G-HA, and EMULGEN LS 110 (trade name, manufactured by Kao Corp.) and NOYGEN XL-80 (trade name, manufactured by Dai-Ichi Kogyo Seiyaku Co., Ltd.).

The (g) polyolefin oligomer refers to homopolymerized or copolymerized oligomers of α-olefins, such as ethylene, propylene, 1-butene, 3-methyl-1-butene, 4-methyl-1-pentene, 3-methyl-1-pentene, 1-heptene, 1-hexene, 1-octene, 1-decene, or 1-dodecene; or conjugated dienes and non-conjugated dienes, such as butadiene, ethylidene norbornene, dicyclopentadiene, or 1,5-hexadiene. Homopolymers of a monomer such as styrene, vinyl acetate, or vinyl alcohol, and copolymers of these monomers and the olefin monomers as mentioned above are also included in the (g) polyolefin oligomer.

Specific examples include oligomers of polyethylene, polypropylene, polybutene, an ethylene-propylene copolymer, an ethylene-vinyl acetate copolymer, an ethylene-ethyl acrylate copolymer, an ethylene-vinyl alcohol copolymer, and an ethylene-styrene copolymer. Furthermore, modified products obtained by grafting an ethylenic unsaturated monomer to the above polymer, oxidizing the above polymer in a molten state using oxygen or an oxygen-containing gas, or halogenating the above polymer using an alkali halide metal, are also included in the (g) polyolefin oligomer.

Examples of the (g) the polyolefin oligomer in the invention include vegetable wax, animal wax, mineral wax, and petrochemical wax, in addition to the above polyolefin oligomers. Preferable examples of the wax include candelilla wax, carnauba wax, Japan wax, esparto grass wax, cork wax, guaruma wax, rice germ oil wax, sugar cane wax, berry wax, ouricury wax, montan wax, jojoba wax, shea butter, beeswax, shellac wax, spermaceti, lanolin, ceresin, paraffin wax, synthetic polyethylene wax, synthetic polypropylene wax, and synthetic ethylene-vinyl acetate copolymer wax. These waxes can be used singly or in combination of two or more thereof.

The number average molecular weight (Mn) of the polyolefin oligomer is preferably in the range of 500 to 100,000, more preferably 600 to 50,000, and still more preferably 700 to 20,000. The number average molecular weight (Mn) can be calculated by the GPC measurement as mentioned above.

In the water dispersion material of the invention, the mass ratio of (e) the polyolefin polymer having a polar group of the invention to (f) the polyethylene glycol alkyl ether ((e)/(f)) in the case of B. above; the mass ratio of (e) the polyolefin polymer having a polar group of the invention and (f) the polyethylene glycol alkyl ether to (g) the polyolefin oligomer ((e)+(f)/(g)) in the case of C. above; or the mass ratio of (e) the polyolefin polymer having a polar group of the invention to (g) the polyolefin oligomer ((e)/(g)) in the case of D. above, is preferably in the range of 100/2 to 100/30, and more preferably 100/5 to 100/20.

In the invention, for the purpose of controlling evaporativity or interfacial properties, a water-soluble organic solvent can be used in the aqueous medium. The water-soluble organic solvent is an organic solvent that does not separate into two phases when added into water, and examples thereof include monohydric alcohols or polyhydric alcohols, nitrogen-containing solvents, sulfur-containing solvents, and derivatives thereof.

Specific examples of the polyhydric alcohols include ethylene glycol, diethylene glycol, propylene glycol, butylene glycol, triethylene glycol, 1,5-pentanediol, 1,2,6-hexanetriol, and glycerol. Specific examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerol. Specific examples of the monohydric alcohols include ethanol, isopropyl alcohol, butyl alcohol, and benzyl alcohol. Specific examples of the nitrogen-containing solvents include pyrrolidone, N-methyl-2-pyrrolidone, cyclohexylpyrrolidone, and triethanolamine. Specific examples of the sulfur solvents include thiodiethanol, thiodiglycerol, sulfolane, dimethyl sulfoxide. Further examples of the solvent include propylene carbonate and ethylene carbonate.

The method for producing the water dispersion material in the invention is not particularly limited, but preferably includes, for example, a mixing process of melt-mixing (e) the polyolefin polymer having a polar group of the invention singly; (e) the polyolefin polymer having a polar group of the invention and (f) the polyethylene glycol alkyl ether; (e) the polyolefin polymer having a polar group of the invention, (f) the polyethylene glycol alkyl ether, and (g) the polyolefin oligomer; or (e) the polyolefin polymer having a polar group of the invention and (g) the polyolefin oligomer, and an emulsification process of emulsifying and dispersing the resultant in the aqueous medium, thereby producing a water dispersion material.

The mixing process is a process of melting the composition of each of the above-described four cases (polymer singly or mixtures thereof) at a temperature higher than the melting point of the composition, and then uniformly mixing the same. More specifically, it is preferable to stir the composition at 80° C. to 200° C. for 10 minutes or more. It is also possible to mix the composition at a temperature equal to or lower than the melting point of each composition. In this case, an organic solvent may be used.

Specific examples of the organic solvents include aromatic hydrocarbons, such as xylene, toluene, or ethylbenzene; aliphatic hydrocarbons, such as hexane, heptane, octane, or decane; cycloaliphatic hydrocarbons, such as cyclohexane, cyclohexene, or methylcyclohexane; ester-based solvents, such as ethyl acetate, n-butyl acetate, cellosolve acetate, propylene glycol monomethyl ether acetate, propylene glycol monoethyl ether acetate, or 3-methoxy butyl acetate; and ketone solvents, such as methyl ethyl ketone or methyl isobutyl ketone. Moreover, mixtures of two or more of these solvents may also be applicable.

The emulsification process is a process of physically emulsifying and dispersing the composition by means of mechanical shearing force.

Specific examples of the emulsification process include:

(1) a method including dissolving a mixture in each case of A. to D. above in a solvent, emulsifying the resultant by a high pressure homogenizer, a high pressure homomixer, or the like, and then removing the solvent therefrom;

(2) a method including melting a mixture in each case of A. to D. above, and emulsifying the resultant by a high pressure homogenizer, a high pressure homomixer, or an extrusion kneader;

(3) a method including emulsifying a mixture in each case of A. to D. above in an autoclave, together with an alkali substance, such as potassium, sodium, or ammonium.

Further examples of the emulsification methods include a method including mechanically pulverizing, a method including spraying and pulverizing at high pressure, and a method including spraying from fine openings. Examples of the machine for emulsifying and dispersing the mixture at a high shearing rate include, in addition to the above, T.K. FILMICS (trade name, manufactured by PRIMIX Corporation), T.K. HOMOMIXER MARKII (trade name, manufactured by PRIMIX Corporation), and an autoclave.

The concentration of the polyolefin polymer having a polar group in the water dispersion material prepared as described above is preferably adjusted to from 0.1 mass % to 80 mass %, and more preferably from 0.5 mass % to 50 mass %.

It is preferable for the water dispersion material of the invention to have a so-called thixotropic property. Here, the thixotropic property refers to a property with which the viscosity decreases as the shearing rate increases. The thixotropic property can be expressed by a thixotropy index (hereinafter sometimes referred to as a TI value). For example, in a thixotropic dispersion system, the viscosity decreases in accordance with the rotation number (the viscosity remains constant in a Newtonian fluid, such as water). In this case, when the viscosity at a rotation number a is defined as $r_{ia}$ and the viscosity at a rotation number b is defined as $r_{ib}$ (a>b), the TI value is represented by the following Equation (4).

$$TI = \eta_b / \eta_a \qquad \text{Equation (4)}$$

Another example of the method for confirming whether the dispersion material is thixotropic or not is a method of measuring a recovery rate. In this measuring method, the time for recovery of a dispersion material when a shearing force is applied thereto is measured. Specifically, when a shearing force is applied to the dispersion material, the application thereof begins with a low shearing rate (Sa). Then, when the viscosity reaches a constant level, the shearing rate is changed to a high shearing rate ($S_b$). When the viscosity at $S_b$ reaches a constant level, the shearing rate is returned to $S_a$ again. When a viscosity-time relationship at this time is plotted, the viscosity gradually recovers in a curve when the sharing rate is turned back from $S_b$ to $S_a$. It can be evaluated that a dispersion material in which the viscosity recovers in a gentle curve maintains a state where the viscosity decreases for a certain period of time. On the other hand, it can be evaluated that a dispersion material in which the viscosity instantaneously recovers in a sharp curve exhibits less "dripping".

When the water dispersion material has a thixotropic property, favorable application properties can be obtained when the water dispersion material is used as a coating liquid.

Any apparatus may be used for the measurement of the confirmation of a thixotropic property, and VAR-50 (trade name, manufactured by REOLOGICA Instruments) or RS150 (trade name, manufactured by Haake) is preferably used.

Specifically, when the water dispersion material of the invention is measured at 20° C. using RS150 (trade name, manufactured by Haake), the viscosity thereof at a shearing rate of 0.1 $s^{-1}$ ($sec^{-1}$) is preferably in the range of 1 mPa·s to 10,000 mPa·s, and more preferably 10 mPa·s to 1,000 mPa·s.

The viscosity at a shearing rate of 1000 $s^{-1}$ is preferably in the range of 0.01 mPa·s to 100 mPa·s, and more preferably 0.05 mPa·s to 50 mPa·s.

The TI value ($\eta_5/\eta_{50}$) calculated from the viscosity $\eta$ at a shearing rate of 5 $s^{-1}$ and at a shearing rate of 50 $s^{-1}$ obtained by the measurement at 20° C. using RS150 (trade name, manufactured by Haake) is preferably 1.20 or more, and more preferably 1.30 or more.

The polyolefin polymer having a polar group of the invention to be dispersed in a water dispersion material is preferably dispersed in the water dispersion material in the form of a worm-like micelle, as illustrated in FIG. 1. FIG. 1 is an enlarged schematic configuration diagram illustrating a state of the polyolefin polymer having a polar group in the water dispersion material. In the worm-like micelle illustrated in FIG. 1, it is considered that the polyolefin polymers having a polar group form an aggregate in such a manner that the polyolefin (PO) portions face inward (portion designated by 2 in FIG. 1) and the polar group portions face outward (portion designated by 1 in FIG. 1), respectively.

As the worm-like micelles are formed and entangled with each other, the viscosity of the water dispersion material is remarkably increased. Therefore, the water dispersion material containing the worm-like micelle exhibits extremely high dispersion stability, and develops high viscoelasticity even when the concentration is low.

The worm-like micelle does not have a fixed length because the micelle is a molecular assembly in which molecules are bonded only by an intermolecular force. Even when the entanglement thereof arises, linking, fusion, and slipping can be achieved by exchanging the molecules, and, in some cases, cleavage and re-linking of the micelles can be achieved.

The shape of the worm-like micelle in the invention is not limited, but the diameter thereof is in the range of several nm to 1 preferably 10 nm to 0.6 µm, and more preferably 20 nm to 0.2 µm. The length of the micelles is not fixed and, in some cases, micelles having a length in the range of several 10 nm to several µm, and those having a length in the range of several 100 µm or more may be present sometimes.

It is also possible to separate the particles in the dispersion from the dispersion system in the invention. The separation of the particles can be carried out by drying or the like. The drying is preferably conducted using a freeze dryer, but a method of using a spray dryer, a rotary dryer, a pneumatic conveyor dryer, a stirring dryer, or the like is also applicable. For example, the freeze-drying can be performed by previously freezing the water dispersion material of the invention to a sufficient degree using a cooling agent, such as liquid nitrogen, and then drying the same under reduced pressure using a commercially-available freeze dryer. The separated particles can be made into a dispersion system again by adding at least one of water or an organic solvent having compatibility with water, and then stirring the mixture using a mechanical shearing device, such as a magnetic stirrer, a three-one motor, an autoclave, a homogenizer, a homomixer, or a T.K. FILMIX (trade name), or irradiating the mixture with ultrasonic waves.

Applications of the water dispersion material of the invention include ink compositions containing a polyolefin polymer having a polar group. The ink composition is an aqueous printing ink composition, and is produced by a known method by adding a vehicle ingredient, a fatty acid or a fatty acid salt, a colorant such as a pigment, and an optional additive such as a filler.

A printed material is also obtained by printing the aqueous printing ink composition to a known print sheet formed from plastics, paper or the like, by a gravure printing method or a flexographic printing method.

Examples of the aqueous resin used as a vehicle resin of the ink composition include water soluble resin or water-dispersion resin, such as an emulsion or a dispersion, for use in common ink, coating materials, and recording agents. The aqueous resin may be any one of the above resins or a mixture thereof. Specific examples of the aqueous resin include polyurethane resin, polyurethane urea resin, acryl-modified urethane resin, acryl-modified urethane urea resin, acrylic resin, styrene-acrylic acid copolymer resin, styrene maleic acid copolymer resin, ethylene-acrylic acid copolymer resin, polyester resin, shellac, rosin-modified maleic resin, vinyl chloride-vinyl acetate copolymer resin, vinyl chloride-acrylic acid copolymer resin, chlorinated polypropylene resin, hydroxyethylcellulose, hydroxypropylcellulose, and butyral. The above materials can be used singly or in combination of two or more thereof.

The ink composition can also be used as an inkjet ink composition.

<Mold Release Agent Composition>

The polyolefin polymer having a polar group of the invention is also suitable as a mold release agent composition for engineering plastics or the like. The polyolefin polymer having a polar group of the invention is thermally stable. In particular, even when mixed with the engineering plastics at a high temperature, the polyolefin polymer having a polar group of the invention does not cause a reaction or the like and can give mold-release properties without causing disassembly of the resin or the like. In this case, the mold release agent is also effective as a lubricant.

Examples of the target engineering plastics include, but not limited thereto, thermoplastic resins, such as polyacetal resin, ABS resin, polyamide resin, polyphenylene oxide resin, polyimide resin, polyether sulfone resin, thermoplastic polyester resin, thermoplastic polyurethane resin, or polycarbonate resin; and thermosetting resin, such as epoxy resin, thermosetting unsaturated polyester resin, or phenol resin. Specific examples thereof include a polyacetal resin (trade name: DURACON M90, manufactured by Polyplastic Co., Ltd.), an ABS resin (trade name: HM-11001, manufactured by Ube-Cyclon Co., Ltd., or trade name: TOYORAK 500, manufactured by Toray Industries, Inc.), a polyamide resin (trade name: ARLEN, manufactured by Mitsui Chemicals, Inc.), a polyimide resin (trade name: AURUM, manufactured by Mitsui Chemicals, Inc.), and a polyether sulfone resin (trade name: PES, manufactured by Mitsui Chemicals, Inc.)

The addition amount of the mold release agent composition (or a lubricant) of the invention depends on the type of the resin to be used, but is preferably in the range of 0.05 part by mass to 20 parts by mass, more preferably 0.1 part by mass to 10 parts by mass, and still more preferably 0.2 part by mass to 5 parts by mass, based on 100 parts by mass of the resin.

Depending on whether the resin is a thermoplastic resin or a thermosetting resin, the molding method may be selected from the molding methods generally and widely used for thermoplastic resins and thermosetting resins, such as an extrusion molding method, an injection molding method, a vacuum molding method, a blow molding method, a press forming method, a transfer-molding method, a RIM molding method, or a cast molding method When the resin is molded using the polyolefin polymer having a polar group of the invention, additives, such as heat-resistant stabilizers, weather-resistant stabilizers, flame retardants, antistatic agents, nucleating agents, colorants, foaming agents, fillers, or reinforcing agents, can be blended in the range in which the objects of the invention are not adversely affected.

EXAMPLES

Hereinafter, the invention will be described more specifically with reference to the Examples and the like, but the invention is not limited thereto.

<Analyzer>

First, the analyzer, the measurement conditions or the like for use in the analysis of a compound in the Examples will be described.

(1) Molecular Weight, Molecular Weight Distribution

The molecular weight of a polymer was measured using the GPC apparatus described in this description, under the conditions described in this description.

(2) $^1$H-NMR Spectrum

The $^1$H-NMR spectrum was measured by the method described in this description using JNM-Model GSX270 manufactured by JEOL Co., Ltd., or Model EX400 manufactured by JEOL Co., Ltd.

(3) Infrared Absorption Spectrum

The infrared absorption spectrum was measured using FT/IR-6100 manufactured by JASCO Corporation.

(4) FD-mass Analysis

The FD-mass was analyzed using JMS-SX 102A manufactured by JEOL Co., Ltd.

(5) Melting Point (Tm)

The melting point was measured using DSC-60A manufactured by Shimadzu Corp., and the peak top temperature obtained by measuring under the following conditions was adopted.

Cell: aluminum
Carrier gas: nitrogen (50 ml/minute)
Temperature program: 30° C. (10° C./minute)→100° C. (5 minute fixation)→350° C. (5 minute fixation)

(6) 5% Loss-in-Weight Temperature (Thermogravimetric Analysis (TGA))

The 5% loss-in-weight temperature was determined using DTG-60 manufactured by Shimadzu Corp., by an analysis from a loss-in-weight curve obtained by the measurement conducted under the following conditions.

Cell: aluminum
Carrier gas: air (100 ml/minute)
Temperature program: 30° C. (10° C./minute)→100° C. (10 minute fixation)→400° C. (5 minute fixation)

(7) Particle Diameter of Emulsion Particles

The 50% volume average particle diameter was measured using MICROTRACK UPA or MICROTRACK HRA manufactured by HONEYWELL.

(8) Observation of a Dispersed Substance in a Water Dispersion Material (Microphotograph)

Observation sample: Diluted with pure water and dyed with phosphotungstic acid while dispersing the sample.
Apparatus: Transmission electron microscope (TEM) H-7650 (manufactured by Hitachi, Ltd.)
Acceleration voltage: 100 kV
Observation magnification: ×200,000

(9) Viscoelastic Properties of a Water Dispersion Material —Evaluation of Thixotropic Property—

Apparatus: VAR-50 (trade name, manufactured by REOLOGICA Instruments AB)
Plate: parallel plate (40 mm in diameter)
Gap: 1 mm —Measurement of Thixotropy Index (TI) Value—

Apparatus: RS150 (manufactured by Haake)

Cell: using coaxial double cylinder (Couette, outer cylinder inner diameter: 43.4 mm, inner cylinder outer diameter: 42.8 mm, inner cylinder inner diameter: 36 mm, central axis diameter: 35.5 mm)

<Synthesis of a Polyolefin Polymer and an Intermediate Compound>

Synthesis Example 1

Synthesis of Polymer (A1)

Ethylene Polymer Having a Double Bond at One Terminal

The following compound (xi) used as a catalyst was synthesized according to Synthesis Example 6 of JP-A No. 2003-73412, and a polyethylene having a double bond at one terminal was synthesized according to Example 8 of the same publication.

A stainless steel autoclave having an internal volume of 2000 ml that was fully substituted with nitrogen was charged with 1000 ml of heptane at room temperature, and the temperature was increased to 150° C. Subsequently, the inside of the autoclave was pressurized with ethylene to 30 kg/cm²G, and the temperature was maintained. 0.5 ml (0.5 mmol) of a hexane solution (1.00 mmol/ml in terms of aluminum atoms) of MMAO (manufactured by Tosoh Finechem Corporation) was supplied under pressure. Subsequently, 0.5 ml (0.0001 mmol) of a toluene solution (0.0002 mmol/ml) of the following compound (xi) was supplied under pressure, and then polymerization was started. The polymerization was performed at 150° C. for 30 minutes in an ethylene gas atmosphere, and then a small amount of methanol was supplied under pressure to thereby stop the polymerization. The obtained polymer solution was added into 3 L of methanol containing a small amount of hydrochloric acid to precipitate a polymer. The polymer was washed with methanol, and was dried with reduced pressure at 80° C. for 10 hours.

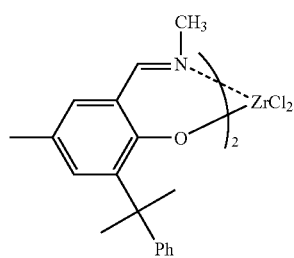

(xi)

The obtained polymer (A1) was a homopolyethylene having a double bond at one terminal, and part of the polymers had a double bond at both terminals. The ¹H-NMR measurement results and the physical properties were as follows.

¹H-NMR: δ ($C_2D_2Cl_4$) 0.81 (t, 3H, J=6.9 Hz), 1.10-1.45 (m), 1.93 (m, 2H), 4.80 (dd, 1H, J=9.2, 1.6 Hz), 4.86 (dd, 1H, J=17.2, 1.6 Hz), 5.60-5.72 (m, 1H)

Double bond content (X): 1.16

Melting point (Tm): 123° C.

Mw: 1,900, Mw/Mn: 2.24

Synthesis Example 2

Synthesis of Polymer (A2)

Ethylene Polymer Having a Double Bond at One Terminal

A 100 ml reactor that was fully dried and substituted with nitrogen was charged with 15.4 g (56.1 mmol) of 5-chlor-3-cumyl salicylaldehyde, 60 ml of toluene, and 4.42 g (40% methanol solution, 56.9 mmol) of methylamine, and the mixture was stirred at room temperature for 5 hours. The reaction solution was concentrated under reduced pressure, thereby obtaining 16.0 g (99% yield) of a dark reddish-brown oil represented by Formula (xii).

¹H-NMR: δ ($CDCl_3$) 1.71 (s, 6H), 3.33 (s, 3H), 7.10-7.44 (m, 7H), 8.16 (s, 1H), 13.8 (s, 1H)

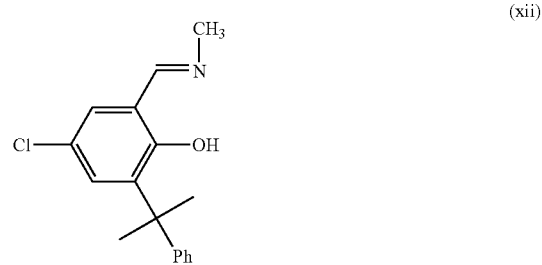 [SMILES: C/N=C/c1cc(Cl)cc(C(C)(C)c2ccccc2)c1O]

(xii)

A 500 ml reactor that was fully dried and substituted with argon was charged with 12.1 g (42.0 mmol) of the compound (xii) above and 150 ml of diethyl ether, and the mixture was cooled to −78° C. and then stirred. To the resultant, 27.8 ml of n-butyllithium (n-hexane solution, 1.57 M, 43.7 mmol) was added dropwise over 30 minutes, and the mixture was stirred at the same temperature for 2 hours. Then, the temperature was slowly increased to room temperature. The resultant was further stirred at room temperature for 3 hours, thereby preparing a lithium salt. The solution was added dropwise in 150 ml of a tetrahydrofuran solution containing 4.84 g (20.8 mmol) of $ZrCl_4(THF)_2$ complex that was cooled to −78° C. After the completion of the dropwise addition, the resultant was continuously stirred while gradually increasing the temperature to room temperature. The resultant was further stirred at room temperature for 12 hours, and then the solvent was distilled off from the reaction liquid.

The obtained solid was dissolved in 200 ml of methylene chloride, and the insoluble matter was removed using a glass filter. The filtrate was concentrated under reduced pressure. Then, the precipitated solid was re-precipitated using 80 ml of diethyl ether and 150 ml of n-hexane, and then dried with reduced pressure, thereby obtaining 11.4 g (75% yield) of a yellow powder compound represented by Formula (xiii).

¹H-NMR: δ ($CDCl_3$) 1.67 (s, 6H), 1.92 (s, 6H), 2.30 (s, 6H), 7.00-7.60 (m, 12H), 7.70 (s, 2H), 7.79 (s, 2H)

FD-mass analysis: 734

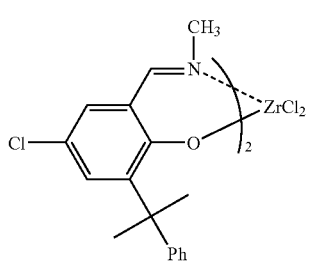

(xiii)

A stainless steel autoclave having an internal volume of 2000 ml that was fully substituted with nitrogen was charged with 1000 ml of heptane, and the temperature was maintained at 150° C. The temperature was increased to 34 kg/cm$^2$G with ethylene. 1 ml (1 mmol) of a hexane solution (1.00 mmol/ml in terms of aluminum atoms) of MMAO (manufactured by Tosoh Finechem Corporation) was supplied under pressure. Then, 3 ml (0.0003 mmol) of a toluene solution (0.0001 mmol/ml) of the following compound (xiii) was supplied under pressure, and then polymerization was started. The polymerization was performed at 150° C. for 30 minutes in an ethylene gas atmosphere, and then a small amount of methanol was supplied under pressure to thereby stop the polymerization.

The solvent was distilled off from the obtained polymer solution, and then the polymer was precipitated. Thereafter, the resultant was dried with reduced pressure at 80° C. for 10 hours. The obtained ethylene polymer (polymer (A2)) was 30.45 g, the polymerization activity was 203 kg/mmol-Zr·hr, and the $^1$H-NMR measurement results and the physical properties were as follows.

Double bond content (X): 0.990
Melting point (Tm): 116° C.
$^1$H-NMR: δ (C$_6$D$_6$) 0.81 (t, 3H, J=6.9 Hz), 1.10-1.45 (m), 1.95 (m, 2H), 4.84 (dd, 1H, J=9.2, 1.6 Hz), 4.91 (dd, 1H, J=17.2, 1.6 Hz), 5.67-5.78 (m, 1H)
Mw: 1380, Mw/Mn: 2.20

Synthesis Example 3

Synthesis of Polymer (A3)

Ethylene-Propylene Copolymer Having a Double Bond at one Terminal

—Preparation of Solid Component (1)—

Under nitrogen flow, 30 g of silica (SiO$_2$) dried at 150° C. for 5 hours was suspended in 466 mL of toluene, and then 134.3 mL (3.08 mmol/mL in terms of Al atoms) of a toluene solution of methylalumoxane was added dropwise over 30 minutes at 25° C. After the completion of the addition dropwise, the temperature was increased to 114° C. over 30 minutes, and the mixture was allowed to react at this temperature for 4 hours. Thereafter, the temperature was reduced to 60° C., and the supernatant liquid was removed by decantation. The solid component thus obtained was washed with toluene 3 times, and then toluene was added, thereby preparing a toluene slurry of the solid component (1). The obtained solid component (1) was partially collected, and then the concentration was measured. As a result, the slurry concentration was 0.150 g/mL and the Al concentration was 1.179 mmol/mL.

—Preparation of a Solid Catalyst Component (2)—

In a 300 mL glass flask that was substituted with nitrogen, 150 mL of toluene was placed, and then the toluene slurry (1.91 g in terms of solid content) of the solid component (1) prepared above was charged therein while stirring. Next, 50.0 mL of a toluene solution (0.0012 mmol/mL in terms of Zr atoms) of the compound (xi) was added dropwise over 15 minutes, and the mixture was allowed to react at room temperature for 1 hour. Thereafter, the supernatant liquid was removed by decantation, and the remaining was washed with heptane 3 times. Then, 100 mL of heptane was added, thereby preparing a heptane slurry of a solid catalyst component (2). The obtained heptane slurry of the solid catalyst component (2) was partially collected, and then the concentration was measured. As a result, the Zr concentration was 0.058 mmol/mL and the Al concentration was 14.8 mmol/mL.

A stainless steel autoclave having an internal volume of 1000 ml that was fully substituted with nitrogen was charged with 450 ml of heptane, and 100 L/hr of ethylene was circulated at room temperature for 15 minutes, whereby the liquid phase and the vapor phase were saturated. Subsequently, 28 NL of propylene was introduced, and the temperature was increased to 80° C. Thereafter, the pressure was increased to 8 kg/cm$^2$G with ethylene, and the temperature was maintained. 0.5 ml (0.5 mmol) of a decane solution (1.00 mmol/ml in terms of aluminum atoms) of triisobutylaluminum was supplied under pressure, subsequently the solid catalyst component (2) was supplied under pressure in an amount of 0.0001 mmol in terms of Zr atoms, and polymerization was started. The polymerization was performed at 80° C. for 60 minutes while maintaining the pressure and continuously supplying ethylene. Then, 5 ml of methanol was supplied under pressure to thereby stop the polymerization. After the temperature was decreased, a monomer was depressurized.

The obtained polymer slurry was mixed with 2 L of methanol and stirred, and then the mixture was filtered. The obtained product was dried with reduced pressure at 80° C. for 10 hours, thereby obtaining 41.4 g of a polymer having a double bond at one terminal as an ethylene-propylene copolymer (polymer (A3)). The physical properties are shown below.

$^1$H-NMR: δ (C$_2$D$_2$Cl$_4$) 0.70-0.99 (m), 1.00-1.75 (m), 1.95-2.15 (m), 4.62-4.72 (m, 0.15H), 4.88-5.04 (m, 2H), 5.38-5.50 (m, 0.54H), 5.72-5.90 (m, 1H)
Double bond content (X): 0.999
Melting point (Tm): 97.5° C.
Mw: 1310, Mw/Mn: 1.66

Synthesis Example 4

Synthesis of Polymer (A4)

Pyrolytic Propylene-Butene Copolymer

A reactor was charged with 200 g of a propylene-butene copolymer (PBR, manufactured by Mitsui Chemicals, Inc.) as a raw material, and then substituted with nitrogen. Then, the resultant was stirred at 360° C. in an nitrogen atmosphere for 120 minutes. After the stirring, the content was taken out from the reactor, and cooled with water. Then, the resultant was dried at 110° C. at 30 kPa for 10 hours, thereby obtaining 190 g of a pyrolytic PBR (polymer (A4)). The physical properties are shown below.

Double bond content (X): 1.16
$^1$H-NMR: δ (CDCl$_3$-d) 0.50-2.10 (m), 4.60-4.80 (m, 2H)
Mw: 43,900, Mw/Mn: 1.85

Example 1

Exemplary Compound (1)

Production of the Polymer Represented by Formula (iii)

A 2000 ml reactor equipped with a reflux tube was charged with the polymer A1 (ethylene polymer having a double bond at one terminal, 145 g) produced in Synthesis Example 1, maleic anhydride (168 g, 1.71 mol), and 2,6-di-tert-butyl-4-methylphenol (226 g, 1.03 mol), and was heated and stirred at 205° C. for 24 hours. After the completion of the reaction, the reaction liquid was added into acetone to precipitate a polymer. The polymer was washed with acetone several times, and dried for 24 hours in a dryer with reduced pressure at 70° C., thereby obtaining 145 g of Exemplary Compound (1) (in Formula (iii), PO=polyethylene, A=B=hydrogen, n=1.16). The inversion ratio (modification ratio) of the double bond calculated from the following $^1$H-NMR results was 99.8%. The physical properties are as follows.

$^1$H-NMR: δ ($C_2D_2Cl_4$) 0.81-0.99 (m), 1.00-1.60 (m), 1.92-2.20 (m), 2.30-2.80 (m), 2.85-3.30 (m), 4.90-5.42 (m), 5.48-5.88 (m)

IR ($cm^{-1}$): 2900, 1864, 1784, 1715, 1470, 1230, 1068, 970, 920, 732, 720

Example 2

Exemplary Compound (2)

Production of the Polymer Represented by Formula (iii)

149 g of Exemplary Compound (2) (in Formula (iii), PO=polyethylene, A=B=hydrogen, n=0.99) was obtained in a manner substantially similar to Example 1, except that the polymer A2 (ethylene polymer having a double bond at one terminal, 150 g) produced in Synthesis Example 2 was used instead of the polymer A1 produced in Synthesis Example 1. The inversion ratio (modification ratio) of the double bond calculated from $^1$H-NMR was 99.9%. The physical properties are as follows.

$^1$H-NMR: δ ($C_2D_2Cl_4$) 0.80-0.95 (m), 1.00-1.60 (m), 1.92-2.12 (m), 2.20-3.20 (m), 5.10-5.42 (m), 5.47-5.72 (m)

IR ($cm^1$): 2958, 1863, 1813, 1716, 1471, 1227, 1119, 1067, 970, 920, 870, 720

Example 3

Exemplary Compound (3)

Production of the Polymer Represented by Formula (iii)

145 g of Exemplary Compound (3) (in Formula (iii), PO=poly(ethylene-propylene), A=B hydrogen, n=1) was obtained in a manner substantially similar to Example 1, except that the polymer A3 (ethylene-propylene copolymer having a double bond, 146 g) produced in Synthesis Example 3 was used instead of the polymer A1 produced in Synthesis Example 1. The inversion ratio (modification ratio) of the double bond calculated from $^1$H-NMR was 99.9%. The physical properties are as follows.

$^1$H-NMR: δ ($C_2D_2Cl_4$) 0.72-0.98 (m), 1.00-1.65 (m), 1.89-2.19 (m), 2.20-3.30 (m), 4.98-5.42 (m), 5.46-5.80 (m)

IR ($cm^{-1}$): 2900, 1864, 1784, 1716, 1474, 1232, 1068, 968, 920, 730, 720

Example 4

Exemplary Compound (4)

Production of the Polymer Represented by Formula (iii)

A 300 ml reactor equipped with a reflux tube was charged with the polymer A4 (propylene-butene copolymer, 20 g) synthesized in Synthesis Example 4, maleic anhydride (10 g, 102 mmol), 2,6-di-tert-butyl-4-methylphenol (0.4 g, 1.82 mmol), and mesitylene (48 ml) as a solvent, and was heated and stirred under reflux for 56 hours. After the completion of the reaction, 60 ml of chloroform was added into a cooled polymer solution and diluted, and this was added dropwise to a large amount of acetone to re-precipitate a polymer. The same re-precipitation treatment was repeated 3 times. Then, the polymer was washed with acetone several times, and dried in a dryer with reduced pressure at 60° C. for 6 hours, thereby obtaining 18.4 g of Exemplary Compound (4) (in Formula (iii), PO=poly(propylene-butene), A=B=hydrogen, n=1.26). The inversion ratio (modification ratio) of the double bond calculated from $^1$H-NMR was 99.9%. The physical properties are as follows.

$^1$H-NMR: δ ($C_2D_2Cl_4$) 0.03-1.74 (m), 1.86-2.10 (m), 2.11-2.31 (m), 2.35-2.54 (m), 2.55-2.80 (m), 2.85-3.14 (m), 3.15-3.36, 4.78-4.83 (m), 4.88-5.00 (m), 5.04-5.21 (m)

IR ($cm^1$): 2723, 1868, 1793, 1458, 1376, 1239, 1165, 971, 826, 767

Example 5

Exemplary Compound (5)

Production of the Polymer Represented by Formula (ii))

A 300 ml reactor equipped with a reflux tube was charged with the polymer A3 (ethylene-propylene copolymer, 10 g) synthesized in Synthesis Example 3, dimethyl maleate (13 g, 90.2 mmol), and 2,6-di-tert-butyl-4-methylphenol (2.5 g, 11.3 mmol). The temperature was increased to 220° C., and the reactor was heated and stirred for 110 hours. After the completion of the reaction, the cooled reaction polymer was crashed, placed in methanol (300 ml), and then washed. Thereafter, the polymer was washed with methanol (300 ml×1 time), and then washed with acetone (300 ml×1 time). The resultant was dried in a dryer with reduced pressure at 60° C. for 2 hours, thereby obtaining 9.78 g of Exemplary Compound (5) (in Formula (ii), PO=poly(ethylene-propylene), A=B=hydrogen, G=T=$OCH_3$, n=0.97). The inversion ratio (modification ratio) of the double bond calculated from $^1$H-NMR was 97.5%. The physical properties are as follows.

$^1$H-NMR: δ ($C_2D_2Cl_4$) 0.80-0.95 (m), 0.97-1.56 (m), 1.90-2.10 (m), 2.12-2.49 (m), 2.51-2.72 (m), 2.74-2.95 (m), 3.60 (s, 6H), 5.19-5.60 (m)

IR ($cm^{-1}$): 2918, 2849, 1741, 1642, 1472, 1463, 1437, 1377, 1261, 1197, 1165, 1008, 969, 909, 844, 730, 720

Example 6

Exemplary Compound (6)

Production of the Polymer Represented by Formula (ii))

8.80 g of Exemplary Compound (6) (in Formula (ii), PO=polyethylene, A=B=hydrogen, G=T=$OCH_3$, n=0.95)

was obtained in a manner substantially similar to Example 5, except that the polymer A2 (ethylene polymer having a double bond at one terminal, 10 g) synthesized in Synthesis Example 2 was used instead of the polymer A3. The inversion ratio (modification ratio) of the double bond calculated from $^1$H-NMR was 96.0%. The physical properties are as follows.

$^1$H-NMR: δ ($C_2D_2Cl_4$) 071-0.93 (br s), 0.94-1.58 (br m), 1.90-2.10 (m), 2.12-2.48 (m), 2.49-3.00 (m), 3.60 (s, 6H), 5.19-5.36 (m), 5.37-5.55 (m)

IR ($cm^1$): 2917, 2849, 1740, 1641, 1473, 1463, 1437, 1364, 1261, 1198, 1164, 1007, 969, 909, 847, 730, 720

Example 7

Exemplary Compound (7)

Production of the Polymer Represented by Formula (i)

A 500 ml reactor equipped with a reflux tube was charged with Exemplary Compound (2) obtained in Example 2 (polymer represented by Formula (iii), 20 g), calcium hydroxide (1.79 g, 24.1 mmol), toluene (100 ml) as a solvent, and distilled water (100 ml), and this mixture was allowed to react at 110° C. for 30 hours. After the completion of the reaction, the temperature was cooled to room temperature, and the aqueous layer was removed by decantation. The obtained polymer was washed with methanol (300 ml×twice), washed with water (300 ml×1 time), and then washed with methanol (300 ml×twice). Then, the resultant was dried with reduced pressure at 60° C. for 7.5 hours, thereby obtaining 20.1 g of Exemplary Compound (7) (in Formula (i), PO=polyethylene, A=B=hydrogen, D=E=O, M=Ca, d=e=j=1, i=2, n=0.99). The physical properties are as follows.

Melting point (Tm): 100° C., 108° C.

5% loss-in-weight temperature (TGA): 288° C.

IR ($cm^1$): 3393, 2914, 2849, 1599, 1565, 1540, 1472, 1423, 1472, 968, 874, 719

Example 8

Exemplary Compound (8)

Production of the Polymer Represented by Formula (i)

A 50 ml reactor equipped with a reflux tube was charged with Exemplary Compound (1) obtained in Example 1 (polymer represented by Formula (iii), 2.0 g), sodium hydroxide (2.0 g, 12.5 mmol), toluene (7 ml) as a solvent, and distilled water (2 ml), and this mixture was allowed to react at 100° C. for 20 hours. After the completion of the reaction, the temperature was cooled to room temperature, and then the aqueous layer was removed by decantation. The obtained polymer was washed with methanol (100 ml×twice), washed with water (100 ml×1 time), and then washed with methanol (100 ml×twice), and dried with reduced pressure at 60° C. for 12 hours, thereby obtaining 1.89 g of Exemplary Compound (8) (in Formula (i), PO=polyethylene, A=B=hydrogen, D=E=O, M=Na, d=e=i=1, j=2, n=1.16). The physical properties are as follows.

Melting point (Tm): 100° C., 119° C.

5% loss-in-weight temperature (TGA): 260° C.

IR ($cm^{-1}$): 3418, 2918, 2849, 1694, 1569, 1473, 1463, 1200, 969, 730, 719

Example 9

Exemplary Compound (9)

Production of the Polymer Represented by Formula (i)

1.89 g of Exemplary Compound (9) (in Formula (i), PO=poly(ethylene-propylene), A=B=hydrogen, D=E=O, M=Na, d=e=i=1, j=2, n=1) was obtained in a manner substantially similar to Example 8, except that Exemplary Compound (3) obtained in Example 3 (polymer represented by Formula (iii), 2.0 g) was used instead of Exemplary Compound (1). The physical properties are as follows.

Melting point (Tm): 100° C., 108° C.

5% loss-in-weight temperature (TGA): 262° C.

IR ($cm^1$): 3437, 2918, 2849, 1569, 1411, 1378, 1311, 970, 729, 720

Example 10

Exemplary Compound (10)

Production of the Polymer Represented by Formula (i)

1.89 g of Exemplary Compound (10) (in Formula (i), PO=polyethylene, A=B=hydrogen, D=E=O, M=Ni, d=e=i=1, j=2, n=0.95) was obtained in a manner substantially similar to Example 8, except that Exemplary Compound (6) obtained in Example 6 (polymer represented by Formula (iii), 2.0 g) was used instead of Exemplary Compound (1). The physical properties are as follows.

Melting point (Tm): 100° C., 114° C.

5% loss-in-weight temperature (TGA): 288° C.

IR ($cm^1$): 3404, 2918, 2849, 1570, 1473, 1463, 1412, 967, 730, 719

Example 11

Exemplary Compound (11)

Production of the Polymer Represented by Formula (ib)

A 500 ml reactor equipped with a reflux tube was charged with Exemplary Compound (2) obtained in Example 2 (polymer represented by Formula (iii), 20 g), sodium hydroxide (4.82 g, 120.5 mmol), toluene (100 ml) as a solvent, and distilled water (20 ml), and a reaction was carried out at 100° C. for 20 hours. After the completion of the reaction, the temperature was cooled to room temperature, and then water was removed by filtration. The obtained polymer was washed with water (300 ml), thereby obtaining a crude product 1 of the polymer represented by Formula (i) (in Formula (i), PO=polyethylene, A=B=hydrogen, D=E=O, M=Na, d=e=i=1, j=2).

Subsequently, the crude product 1 and 5 mass % of an aqueous calcium chloride solution (300 ml) were placed in a 500 ml reactor equipped with a reflux tube, and a salt exchange reaction was performed at 100° C. for 1 hour. After the reaction, the temperature was cooled to room temperature, and then the aqueous layer was removed by decantation. Furthermore, the salt exchange reaction was performed in a similar manner 3 times, thereby obtaining a crude product 2. The crude product 2 was washed with water (300 ml×1 time), washed with methanol (300 ml×1 time), washed with water (300 ml×1 time), and then washed with methanol (300 ml×1 time). The resultant was dried with reduced pressure at 60° C. for 10 hours, thereby obtaining 20.1 g of Exemplary Compound (11) (in Formula (Ib), PO=polyethylene, A=B=hydrogen, D=E=O, L=Ca, d=e=l=1, k=2, n=0.99). The physical properties are as follows.

Melting point (Tm): 90° C., 120° C.
5% loss-in-weight temperature (TGA): 284° C.
IR (cm$^{-1}$): 3413, 2918, 2850, 1559, 1472, 1463, 1313, 972, 719

Example 12

Exemplary Compound (12)

Production of the Polymer Represented by Formula (i)

30 g of Exemplary Compound (12) (in Formula (i), PO=poly(propylene-butene), A=B=hydrogen, D=E=O, M=Na, d=e=i=1, j=2, n=1.26) was obtained in a manner substantially similar to Example 8, except that Exemplary Compound (4) obtained in Example 4 (polymer represented by Formula (iii), 32 g) was used instead of Exemplary Compound (1). The physical properties are as follows.

Melting point (Tm): 78° C.
5% loss-in-weight temperature (TGA): 284° C.
IR (cm$^{-1}$): 2853, 2724, 1580, 1440, 1375, 1302, 1256, 1238, 1163, 1001, 972, 917, 898, 824, 808, 766

Example 13

Production of a Water Dispersion Material (1)

Exemplary Compound (10) (polymer represented by Formula (i), 18 g) obtained in Example 10 and 72 g of distilled water were placed in a high speed mixer (device name: T.K. FILMIX Model 56-50, manufactured by PRIMIX Corporation), and heated and stirred at 120° C. for 60 seconds at a peripheral speed of 50 m/second. The particle size distribution of the obtained water dispersion emulsion was measured. As a result, a water dispersion material (1) having a 50% volume average particle diameter of 69 nm was obtained.

Figure 2:
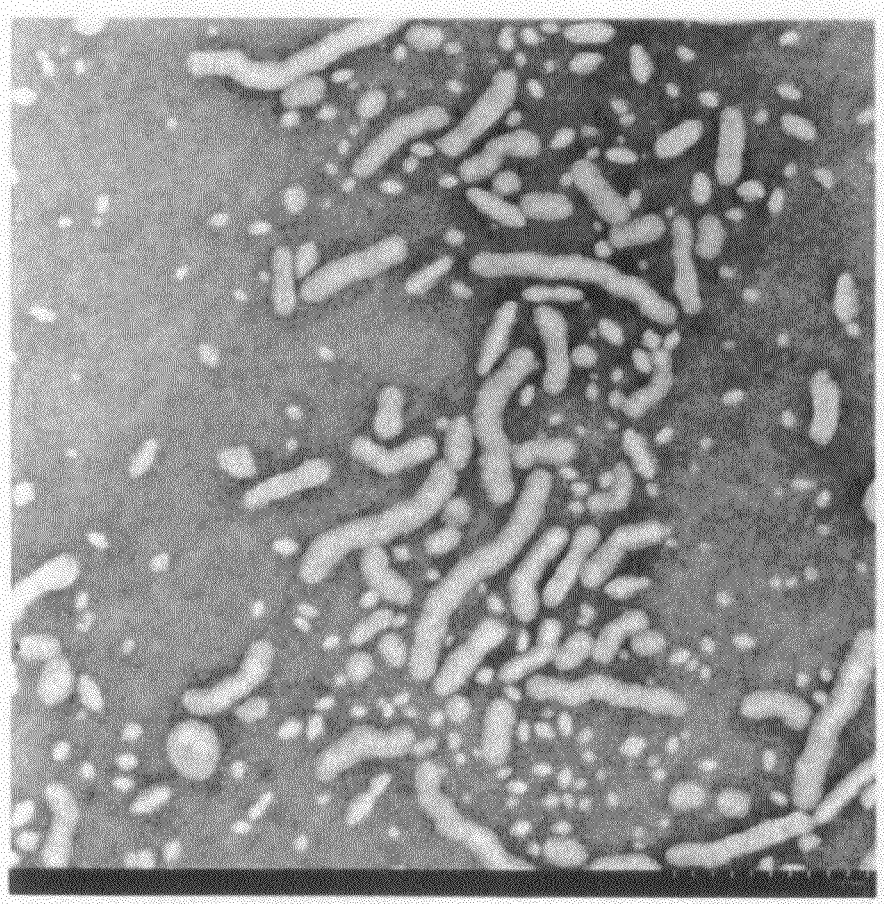
[FIG. 2] A transmission electron microscope (TEM) photograph of a water dispersion material of Example 13.

The water dispersion material (1) was allowed to stand for 1 week, and then diluted 20 times with distilled water. Then, the resultant was observed using a TEM (magnification: 200,000 times), and it was confirmed that the dispersion material has a worm-like micelle shape as illustrated in FIG. 2.

Example 14

Production of a Water Dispersion Material (2)

A water dispersion material (2) having a 50% volume average particle diameter of 73 nm was obtained in a manner substantially similar to Example 13, except that Exemplary Compound (8) obtained in Example 8 (the compound represented by Formula (i)) was used instead of Exemplary Compound (10).

Example 15

Production of a Water Dispersion Material (3)

A water dispersion material (3) in which a dispersed substance had a 50% volume average particle diameter of 15 nm was obtained in a manner substantially similar to Example 13, except that Exemplary Compound (9) obtained in Example 9 (the compound represented by Formula (i)) was used instead of Exemplary Compound (10).

Figure 3:
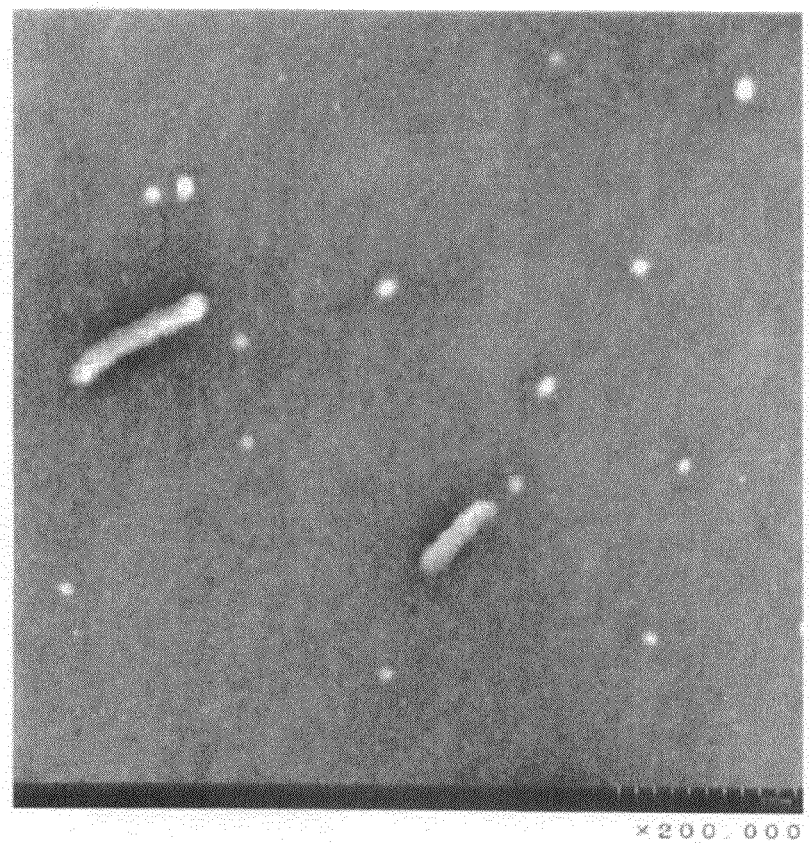
[FIG. 3] A transmission electron microscope (TEM) photograph of a water dispersion material of Example 15.

After being allowed to stand for 1 week, the water dispersion material (3) was observed using a TEM in a similar manner to Example 13, and it was confirmed that the dispersion material has a worm-like micelle shape as illustrated in FIG. 3.

Comparative Example 1

A sodium salt of MITSUI HIGH WAX (trade name, product number: HW1105A, an acid-modified type, acid value: 60 mg/g, manufactured by Mitsui Chemicals, Inc.) was obtained in a manner substantially similar to Example 8, except that the MITSUI HIGH WAX was used instead of Exemplary Compound (1). The physical properties are shown below.

Melting point (Tm): 94° C., 106° C., 127° C., 128° C.
5% loss-in-weight temperature (TGA): 246° C.
IR (cm$^{-1}$): 3414, 2915, 2849, 1568, 1472, 1464, 1412, 1377, 1301, 1187, 729, 720

A water dispersion material (A) having a 50% volume average particle diameter of 1750 nm was obtained in a manner substantially similar to Example 13, except that the sodium salt of MITSUI HIGH WAX synthesized above was used instead of Exemplary Compound (10). The particle diameter was larger than that of Examples 13 and the like, and thus a finely dispersed emulsion was not obtained.

Comparative Example 2

To a 300 ml glass flask, the polymer A1 (ethylene polymer having a double bond at one terminal, 15 g) produced in Synthesis Example 1 and 2.7 g of maleic anhydride were added, and the mixture was allowed to react at 200° C. in a nitrogen atmosphere for 6 hours. The excess amount of unreacted maleic anhydride was removed under reduced pressure (10 mmHg) over 1 hour, thereby obtaining a polyethylene terminated with maleic anhydride.

The inversion ratio (modification ratio) of the double bond in the polyethylene terminated with maleic anhydride calculated from the following $^1$H-NMR results was 32%.

$^1$H-NMR: δ ($C_2D_2Cl_4$) 0.81-0.95 (br t), 0.96-1.11 (br m), 1.12-1.58 (m), 1.96-2.11 (m), 2.32-2.73 (m), 2.87-3.03 (m), 3.04-3.20 (m), 4.85-5.05 (m), 5.19-5.40 (m), 5.50-5.67 (m), 5.71-5.89 (m)

A sodium salt of a polymer having a low degree of modification ratio was obtained in a manner substantially similar to Example 8, except that the polymer synthesized above was used instead of Exemplary Compound (1). The physical properties are as follows.

Melting point (Tm): 99° C., 120° C.
5% loss-in-weight temperature (TGA): 287° C.
IR (cm$^1$): 2917, 2849, 1574, 1473, 1463, 1415, 991, 909, 730, 719

A process substantially similar to Example 13 was performed, except that the sodium salt of a polymer having a low degree of modification ratio synthesized above was used instead of Exemplary Compound (1). As a result, no water dispersion material was obtained and the polymer formed an aggregation that was separated from the distilled water.

Example 16

Evaluation of Thixotropic Property

Figure 4:
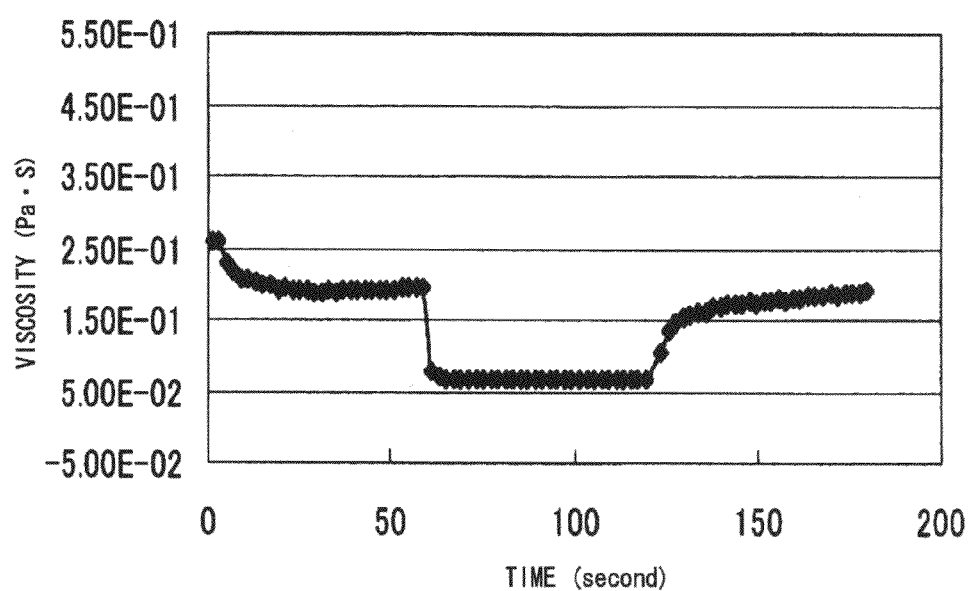
[FIG. 4] A graph illustrating a relationship between the shearing conditions and the viscosity of the water dispersion material of Example 13.

The thixotropic property of the water dispersion material (1) of Example 13 was evaluated using VAR-50 (trade name, manufactured by REOLOGICA Instruments). The measurement was performed at a temperature of 20° C. while changing the shearing conditions, i.e., changing a shearing rate in the order of from 1 s$^{-1}$ for 60 seconds, 30 s$^{-1}$ for 60 seconds, and then 1 s$^{-1}$ for 60 seconds. FIG. 4 illustrates a graph of a relationship between the viscosity (Pa·s) and time (second) obtained by the measurement. The graph shows a thixotropic property in which the viscosity gradually recovers in a gentle curve, 120 seconds after the shearing rate was returned to a low shearing rate (1 s$^{-1}$) from a high shearing rate (30 s$^{-1}$).

Comparative Example 3

The thixotropic property was evaluated in a manner substantially similar to Example 16, except that water was used as a measurement sample.

Figure 5:
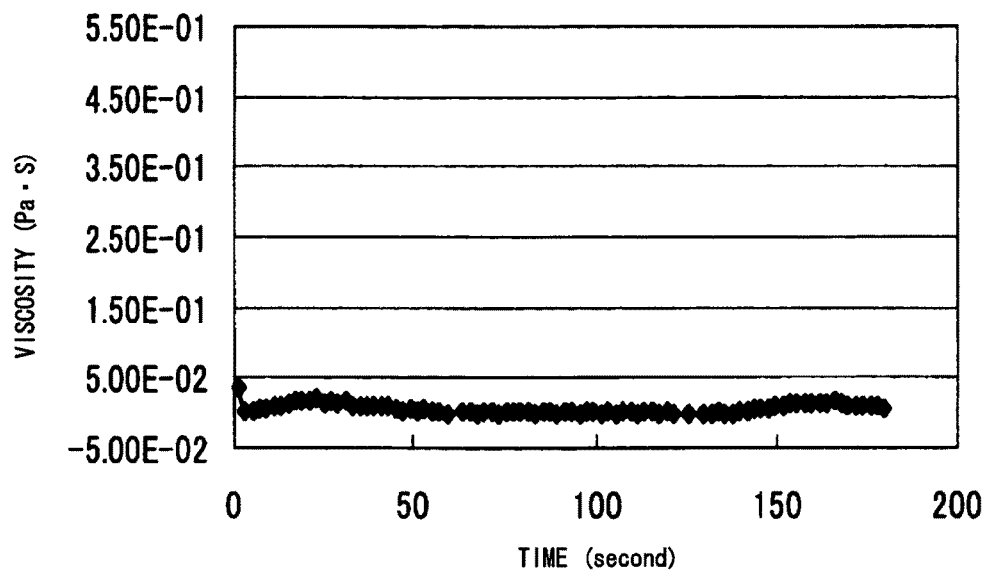
[FIG. 5] A graph illustrating a relationship between the shearing conditions and the viscosity obtained in Comparative Example 3.

FIG. 5 illustrates a graph of a relationship between the viscosity (Pa·s) and the time (second) obtained by the measurement. The graph shows an almost straight line, and does not show a thixotropic property.

Comparative Example 4

The thixotropic property was evaluated in a manner substantially similar to Example 16, except that the water dispersion material (A) of Comparative Example 1 was used as a measurement sample.

Figure 6:
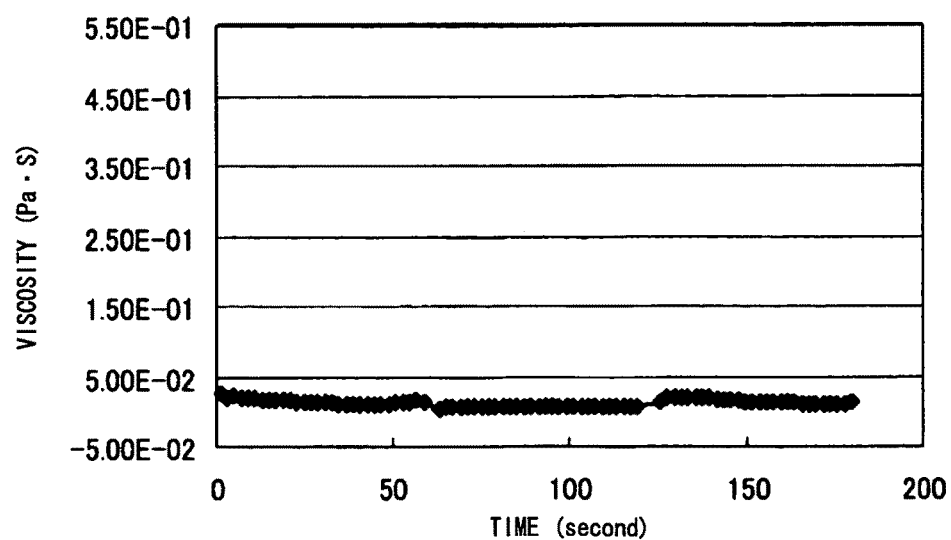
[FIG. 6] A graph illustrating a relationship between the shearing conditions and the viscosity obtained in Comparative Example 4.

FIG. 6 illustrates a graph of a relationship between the viscosity (Pa·s) and the time (second) obtained by the measurement. The graph shows an almost straight line, and does not show a thixotropic property.

Example 17

Measurement of TI Value

The viscosity-shearing rate was measured using the water dispersion material (1) of Example 13. The measurement was performed using RS150 (trade name, manufactured by Haake) by gradually increasing the shearing rate from 1 s$^{-1}$ to 200 s$^{-1}$. The measurement was performed at a temperature of 20° C.

Figure 7:
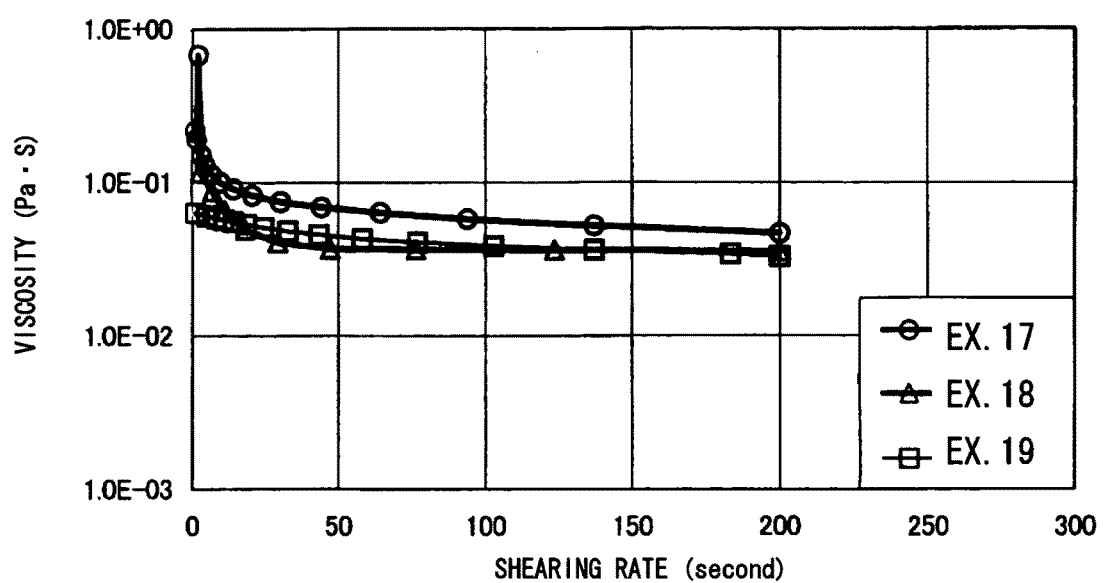
[FIG. 7] A graph illustrating a relationship between the shearing conditions and the viscosity obtained in Examples 17 to 19.

FIG. 7 illustrates a graph of the viscosity (Pa·s) and the shearing rate (1/s) obtained by the measurement. From the curve obtained from the graph, the viscosity when the shearing rate was 5 s$^{-1}$ and the viscosity when the shearing rate was 50 s$^{-1}$ were determined, and then the TI value was calculated. The TI value is illustrated in Table 3.

Example 18

Measurement of Ti Value

A process substantially similar to Example 17 was performed, except that the water dispersion material (2) of Example 14 was used as a measurement sample. FIG. 7 illustrates a graph of a relationship between the viscosity (Pa·s) and the shearing rate (1/s) obtained by the measurement. The TI value is illustrated in Table 3.

Example 19

Measurement of Ti Value

A process substantially similar to Example 17 was performed, except that the water dispersion material (3) of Example 15 was used as a measurement sample. FIG. 7 illustrates a graph of a relationship between the viscosity (Pa·s) and the shearing rate (1/s) obtained by the measurement. The TI value is illustrated in Table 3.

TABLE 3

| | Shearing rate (1/s) | Viscosity η (Pa·s) | TI value ($\eta_5/\eta_{50}$) |
|---|---|---|---|
| Example 17 | 5 | 0.1257 | 1.86 |
| | 50 | 0.0677 | |
| Example 18 | 5 | 0.0629 | 1.62 |
| | 50 | 0.0388 | |
| Example 19 | 5 | 0.0615 | 1.39 |
| | 50 | 0.0442 | |

Example 20

Evaluation as a Mold Release Agent 45 g of polycarbonate (trade name: PANLITE, a low viscosity type, manufactured by Teijin Chemicals Ltd.) and 0.135 g (0.3 mass %) of Exemplary Compound (2) (polymer represented by Formula (iii)) obtained in Example 2 were heated and kneaded (280° C., 100 rpm, 5 minutes) using a laboratory blast mill (manufactured by Toyo Seiki Seisaku-Sho, Ltd.) After the kneading, a portion of the resultant was collected as a sample for melt flow (MFR) and the remaining portion was cooled to room temperature while being adhered to a screw.

The mold release properties were evaluated in accordance with the following criteria.
○: Polycarbonate was easily peeled off from the screw with a spatula.
Δ: Polycarbonate was easily peeled off from the screw with a metal brush.
x: Polycarbonate was hard to be peeled off from the screw with a metal brush.

The results are shown in table 4.

Example 21

Evaluation as a Mold Release Agent

A process substantially similar to Example 20 was performed, except that Exemplary Compound (3) obtained in Example 3 (polymer represented by Formula (iii)) was used instead of Exemplary Compound (2).

The evaluation results are shown in Table 4.

Example 22

Evaluation as a Mold Release Agent

A process substantially similar to Example 20 was performed, except that Exemplary Compound (7) obtained in Example 7 (polymer represented by Formula (i)) was used instead of Exemplary Compound (2).

The evaluation results are shown in Table 4.

Example 23

Evaluation as a Mold Release Agent

A process substantially similar to Example 20 was performed, except that Exemplary Compound (10) obtained in Example 10 (polymer represented by Formula (i)) was used instead of Exemplary Compound (2).

The evaluation results are shown in Table 4.

Comparative Example 5

A process substantially similar to Example 20 was performed, except that LICOWAX E (trade name, a mold release agent manufactured by Clariant (Japan) K.K.) instead of Exemplary Compound (2).
The evaluation results are shown in Table 4.

Comparative Example 6

A process substantially similar to Example 20 was performed, except that LICOMONT NaV101 (trade name, a mold release agent manufactured by Clariant (Japan) K.K.) was used instead of Exemplary Compound (2).
The evaluation results are shown in Table 4.

TABLE 4

| | Additive | Resin for kneading | Mold release properties | MFR (g/minute)[1] |
|---|---|---|---|---|
| Example 20 | Exemplary compound (2) | Polycarbonate | ○ | 11.2 |
| Example 21 | Exemplary compound (3) | Polycarbonate | ○ | 11.5 |
| Example 22 | Exemplary compound (7) | Polycarbonate | ○ | 12.0 |
| Example 23 | Exemplary compound (10) | Polycarbonate | ○ | 10.5 |
| Comp. Ex. 5 | LICOWAX E | Polycarbonate | Δ | Foam-shaped, unmeasurable[2] |
| Comp. Ex. 6 | LICOMONT NaV101 | Polycarbonate | x | Foam-shaped, unmeasurable[2] |

[1]MFR: Test temperature (280° C.), Load (2.16 Kg), Test method (A method: CUT)
[2]Foam-shaped: Resin is considered to be remarkably decomposed.

As shown in Examples 13 to 23, the water dispersion material using the polyolefin polymer having a polar group of the invention demonstrates favorable dispersibility and liquid properties, and favorable mold release properties were obtained even when the polyolefin polymer having a polar group is mixed in a resin.

In contrast, in the Comparative Examples, these properties were not sufficiently obtained.
[Description of Reference Numerals]
Outside of a worm-like micelle
Inside of a worm-like micelle

The invention claimed is:

1. A polyolefin polymer having a polar group represented by Formula (i):

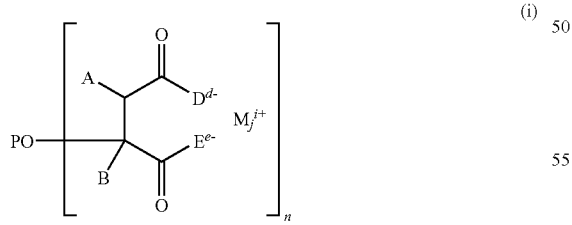

(i)

wherein in Formula (i), PO represents a homopolymer of ethylene, and a group shown in the brackets is the polar group of the polyolefin polymer; A and B each independently represent $R^1$, a cyano group, $C(O)OR^1$, or $C(O)NR^1R^2$, and A and B may be combined to form a cyclic structure; M represents a metal cation or an onium cation; j is an integer of 0 to 4 representing the number of the metal cation or the onium cation; i is an integer of 1 to 4 representing the number of valency of the metal cation or the onium cation; D and E each independently represent an oxygen atom, a nitrogen atom, a sulfur atom, $R^3$, $OR^3$, $SR^3$, or $NR^3R^4$, and D and E may be combined to form a cyclic structure; d and e each independently are an integer of 0 to 4 representing respectively the number of valency of the substituent D and the number of valency of the substituent E; $R^1$, $R^2$, $R^3$, and $R^4$ each independently represent hydrogen, an optionally substituted alkyl, alkenyl, alkynyl, aralkyl or aryl group having 20 or less carbon atoms, or a group having a heterocyclic ring; and n represents the average number of functional groups, and ranges from 0.80 to 10.0.

2. A water dispersion material, comprising an aqueous medium and the polyolefin polymer having a polar group according to claim 1 that is dispersed in the aqueous medium.

3. The water dispersion material according to claim 2, having a thixotropic property.

4. The water dispersion material according to claim 2, wherein the polyolefin polymer having a polar group is dispersed in the form of a worm-like micelle.

5. The water dispersion material according to claim 2, wherein the polar group is present at one terminal or both terminals of the polyolefin polymer.

6. A polyolefin polymer having a polar group represented by Formula (ii):

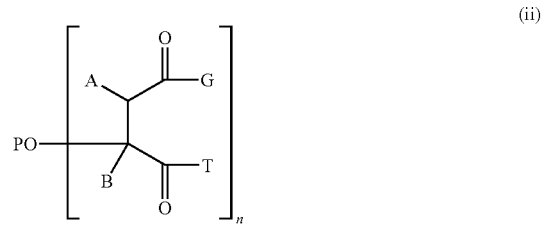

(ii)

wherein in Formula (ii), PO represents a homopolymer of ethylene, and a group shown in the brackets is the polar group of the polyolefin polymer; A and B each independently represent $R^1$, a cyano group, $C(O)OR^1$, or $C(O)NR^1R^2$, and A and B may be combined to form a cyclic structure; G and T each independently represent halogen, $R^5$, $OR^5$, $SR^5$, or $NR^5R^6$, and G and T may form a cyclic structure; $R^1$, $R^2$, $R^5$, and $R^6$ each independently represent hydrogen, an optionally substituted alkyl, alkenyl, alkynyl, aralkyl, or aryl group having 20 or less carbon atoms, or a group having a heterocyclic ring; n represents the average number of functional groups, and ranges from 0.80 to 10.0; and the modification ratio of double bonds in the PO achieved by the polar group shown in the brackets is 80% or more.

7. A polyolefin polymer having a polar group represented by Formula (iii):

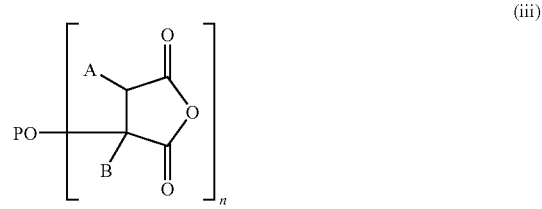

(iii)

wherein in Formula (iii), PO represents a homopolymer of ethylene, and a group shown in the brackets is the polar group of the polyolefin polymer; A and B each independently represent $R^1$, a cyano group, C(O)

$OR^1$, or $C(O)NR^1R^2$, and A and B may be combined to form a cyclic structure; $R^1$ and $R^2$ each independently represent hydrogen, an optionally substituted alkyl, alkenyl, alkynyl, aralkyl, or aryl group having 20 or less carbon atoms, or a group having a heterocyclic ring; n represents the average number of functional groups, and ranges from 0.80 to 10.0; and the modification ratio of double bonds in the PO achieved by the polar group shown in the brackets is 80% or more.

8. The polyolefin polymer having a polar group according to claim 1, wherein the polar group is present at one terminal or both terminals of the polyolefin polymer.

9. The polyolefin polymer having a polar group according to claim 6, wherein the polar group is present at one terminal or both terminals of the polyolefin polymer.

10. The polyolefin polymer having a polar group according to claim 7, wherein the polar group is present at one terminal or both terminals of the polyolefin polymer.

11. A water dispersion material, comprising an aqueous medium and the polyolefin polymer having a polar group according to claim 6 that is dispersed in the aqueous medium.

12. A water dispersion material, comprising an aqueous medium and the polyolefin polymer having a polar group according to claim 7 that is dispersed in the aqueous medium.

13. A mold release agent composition, comprising the polyolefin polymer having a polar group according to claim 1.

14. A mold release agent composition, comprising the polyolefin polymer having a polar group according to claim 6.

15. A mold release agent composition, comprising the polyolefin polymer having a polar group according to claim 7.

16. A method for producing a polyolefin polymer having a polar group according to claim 1, the method comprising:
   synthesizing a homopolymer of ethylene having one or more unsaturated bonds at least at one terminal or at the inside of a polymer chain;
   synthesizing an intermediate compound by modifying the unsaturated bond of the homopolymer of ethylene by reacting the homopolymer of ethylene, a polymerization inhibitor, and at least one selected from the compounds represented by Formulae (vii), (viii), or (x); and
   hydrolyzing the intermediate compound:

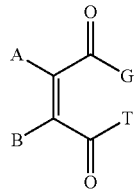

(vii)

wherein in Formula (vii), A and B each independently represent $R^1$, a cyano group, $C(O)OR^1$, or $C(O)NR^1R^2$, and A and B may be combined to form a cyclic structure; G and T each independently represent halogen, $R^5$, $OR^5$, $SR^5$, or $NR^5R^6$, and G and T may form a cyclic structure; and $R^1$, $R^2$, $R^5$, and $R^6$ each independently represent hydrogen, an optionally substituted alkyl, alkenyl, alkynyl, aralkyl, or aryl group having 20 or less carbon atoms, or a group having a heterocyclic ring:

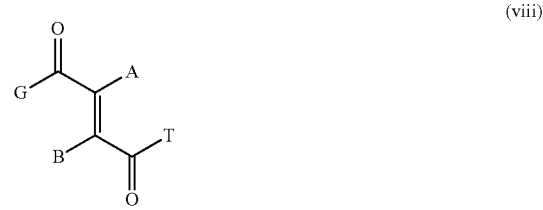

(viii)

wherein in Formula (viii), A, B, G, and T have the same definitions as those in Formula (vii): and

(x)

wherein in Formula (x), A and B have the same definitions as those in Formula (vii).

17. A method for producing a polyolefin polymer having a polar group, the method comprising subjecting the polyolefin polymer having a polar group according to claim 1 to a salt exchange reaction.

\* \* \* \* \*